United States Patent
Oliver et al.

(10) Patent No.: US 9,854,385 B2
(45) Date of Patent: Dec. 26, 2017

(54) CONDITIONAL SEPARATION ALERT SYSTEM

(71) Applicants: Ian James Oliver, Mawson (AU); Stephen Edward Ecob, Chatswood West (AU)

(72) Inventors: Ian James Oliver, Mawson (AU); Stephen Edward Ecob, Chatswood West (AU)

(*) Notice: Subject to any disclaimer, the term of this patent is extended or adjusted under 35 U.S.C. 154(b) by 287 days.

(21) Appl. No.: 14/556,151

(22) Filed: Nov. 30, 2014

(65) Prior Publication Data

US 2015/0154847 A1 Jun. 4, 2015

(30) Foreign Application Priority Data

| Nov. 29, 2013 | (AU) | ................................. | 2013904636 |
| Nov. 29, 2013 | (AU) | ................................. | 2013904637 |
| May 15, 2014 | (AU) | ................................. | 2014901806 |
| May 15, 2014 | (AU) | ................................. | 2014901807 |

(51) Int. Cl.

| *G08B 21/24* | (2006.01) |
| *H04W 4/00* | (2009.01) |
| *H04Q 9/00* | (2006.01) |
| *G08B 13/14* | (2006.01) |
| *G08B 21/02* | (2006.01) |

(52) U.S. Cl.
CPC ........ *H04W 4/008* (2013.01); *G08B 13/1427* (2013.01); *G08B 21/0227* (2013.01); *G08B 21/0247* (2013.01); *G08B 21/24* (2013.01); *H04Q 9/00* (2013.01); *G08B 13/1436* (2013.01); *G08B 21/0277* (2013.01)

(58) Field of Classification Search
None
See application file for complete search history.

(56) References Cited

U.S. PATENT DOCUMENTS

| 6,133,830 A * | 10/2000 | D'Angelo | .......... | G08B 13/1409 340/539.1 |
| 7,009,512 B2 * | 3/2006 | Cordoba | ............ | G08B 13/1427 340/539.23 |
| 7,042,360 B2 * | 5/2006 | Light | ................... | A01K 15/021 340/568.2 |
| 7,535,357 B2 * | 5/2009 | Enitan | ................ | G08B 13/1427 340/539.11 |
| 7,855,642 B2 * | 12/2010 | Veiga, III | ........... | G08B 13/1436 340/539.1 |
| 8,019,322 B2 * | 9/2011 | Satou | ....................... | G06F 21/31 340/568.1 |
| 8,299,921 B2 * | 10/2012 | LaSala | ................... | A63B 55/00 206/315.2 |
| 8,321,124 B2 * | 11/2012 | Curatolo | ............... | G01S 5/0036 340/539.1 |

(Continued)

OTHER PUBLICATIONS

Track R, Track your phone, wallet, keys and anything else with TrakR!, Retrieved Mar. 1, 2015 from internet <url:http://www.thetrackr.com>.

*Primary Examiner* — Albert Wong

(57) ABSTRACT

A system for detecting and reporting the separation of two entities including where the entities are people or items. In some implementations, the system performs separation checking triggered by movement conditions, or by checking of the state of an entity upon separation, and additionally adapts checking methods according to a condition.

5 Claims, 12 Drawing Sheets

(56) References Cited

U.S. PATENT DOCUMENTS

| | | | |
|---|---|---|---|
| 8,836,501 B2 | 9/2014 | Song | |
| 2002/0121976 A1* | 9/2002 | Huang | G08B 3/10 340/571 |
| 2005/0110639 A1* | 5/2005 | Puzio | G08B 13/14 340/572.1 |
| 2005/0219052 A1* | 10/2005 | Chaco | G07C 1/10 340/572.1 |
| 2006/0267762 A1* | 11/2006 | Jedlicka | G08B 13/1427 340/539.23 |
| 2008/0204239 A1* | 8/2008 | Marszalek | G08B 13/1427 340/572.1 |
| 2011/0092161 A1* | 4/2011 | Dotan | G08B 21/0225 455/41.3 |
| 2012/0242481 A1* | 9/2012 | Gernandt | G06K 19/0705 340/539.13 |
| 2014/0145847 A1* | 5/2014 | Jenkins | G08B 13/1427 340/572.1 |
| 2015/0029026 A1* | 1/2015 | Brandes | A45C 13/18 340/571 |
| 2015/0070169 A1* | 3/2015 | Ross-Mowat | G08B 13/1427 340/572.1 |

* cited by examiner

CONDITIONAL SEPARATION ALERT SYSTEM

CROSS REFERENCE TO RELATED APPLICATIONS

This application claims priority to Australian Provisional Patent Application No. 2013904637, filed on Nov. 29, 2013, entitled LOSS PREVENTION DEVICE, and Australian Provisional Patent Application No. 2014901806, filed on May 15, 2014, entitled LOSS PREVENTION DEVICE, and Australian Provisional Patent Application No. 2013904636, filed on Nov. 29, 2013, entitled UV RADIATION PROTECTION SYSTEM, and Australian Provisional Patent Application No. 2014901807, filed on May 15, 2014, entitled UV RADIATION PROTECTION SYSTEM, which are hereby incorporated by reference in their entirety.

TECHNICAL FIELD

The subject matter disclosed herein generally relates to detecting and reporting the separation of two entities including where the entities are people or items. Specifically, the present disclosure addresses systems and methods to perform separation checking triggered by movement conditions and checking of the state of an entity upon separation. As well as adapting checking methods according to a condition.

BACKGROUND

In our busy lives it is easy to forget items that we need during the day such as umbrellas, hats, bags and sunscreen as a few examples. It is inconvenient to have to return home or to another location such as an office to pick them up. When we are leaving a location like a house it is also inconvenient to always check predicted weather conditions such as UV levels which would necessitate taking sunscreen, hats, sunglasses or umbrellas etc. If possessions are left at locations where there is a high risk of another party taking or stealing the possession then there may be a need to warn the user very quickly, depending on the level of risk of the location. Ideally the user should be warned as soon as they have left the area or are in the process of leaving the area. Some present solutions exist that provide a mechanism to locate items that have been lost, but this is inadequate because as soon as an item has been left in an area of high risk the item may be stolen or moved. Such methods also rely on there being other monitoring to locate the device, which will not always be available, and so will limit the utility of that approach.

If the user and the possession are in the same area of risk it may not be case that the user leaves the area while the possession remains, it may instead be the case that the possession leaves the area, for example because a thief takes the possession away. An example of this may be when the thief takes a bag away from the proximity of the user. If the user and the possession are in the same area of risk and the possession is moved or touched whilst staying within the area of risk then it would be desirable for the user to be alerted. For example, the possession may be a bag with a pocket with a zip closing the pocket. If the user and the bag are both at an airport (where the user may be easily distracted and thus not noticing someone opening the zip, perhaps while his back is turned concentrating on ticket reservations) then it would be desirable for the user to be warned if the zip is opened. Depending on the risk level of the area or time of day, while the bag is in the area there may be a need to also warn if the bag is even moved slightly, indicating the very beginning of a theft. It would be helpful if the monitoring could be automatically started or the user might require monitoring to start even without personally realising that the area is risky.

The user may sometimes need to leave a possession in a risk area where actuation of an entity, such as attempted operation of a lock or movement of a bike, should be enough to alert the user. In some high risk areas even approaching the entity might warrant warning. Power considerations should be balanced so that the small devices using Bluetooth Low Energy processors or similar devices minimise the amount of transmitting they perform to extend the life of the small batteries they use. It is the object of the present invention to fulfil these needs.

SUMMARY

A system which provides various situational based warnings on the state of possessions relative to a moving, mobile user or fixed monitoring point is provided. The disclosed system may also be used to protect persons such as dependent children, so throughout the balance of this document possessions, persons and other objects requiring protection shall be referred to as "entities".

The system is provided as follows. The user has a mobile computing device 102 and one or more entity detection devices 110 attached to entities such as Umbrellas 131, sunscreen 133, children 132, bags 299 and bikes 150. The entity detection devices 110 can be temporarily or permanently attached and may also be replaceable. Radio communication using (but not limited to) Bluetooth Low Energy (Bluetooth 4) is used to determine the proximity and the presence of an entity. The radio communication is also used to transmit information, such as whether an event occurs. An examples of an event is the movement or opening of a bag 299 as indicated by an accelerometer 118, gyroscope 119, contact switches, potentiometers, magnetometers, Passive Infrared (PIR) sensor or any other type of sensor.

The behaviour of the entity detection device 110 and mobile computing device may vary according to characteristics of the current position and/or states of a person or entity causing a multiplicity of different warnings and alerts to be generated according to the said position and states.

Potential positions and/or states the system may enter include but are not limited to: First, the movement or transition of user and mobile computing device between various areas zone, for example between 100 and 120, but the entity and associated or attached entity detection device 110 is left behind. Second, transition between areas or times of various different risk levels requiring the frequency of communication connections between 102 and 110 to be increased for higher risk areas to provide prompt warnings if entity and user are separated. Third, the movement of entity and associated entity detection device 110 as detected by accelerometer and/or gyroscope 119 potentially as the entity is being separated from the user. Fourth, the changed state of the entity as detected by the attached entity detection device 110, such as the opening of a bag 299 or other events causing the user's mobile computing device to alert the user Fifth, the movement of person as measured by a mobile computing device's accelerometer 118 relative to an entity as measured by the entity detection device and warning the user that the entity may be left behind. Sixth, the transition of the user and his mobile computing device out of the area but another mobile computing device 102 performing the same role or monitoring and optionally also in a fixed position termed a "hub" 109. A hub 109 is a mobile computing device 102 in a fixed position (and optionally also moveable). The hub 109 can receive and transmit to the area 120. Seventh, an entity detection device or Mobile Computing Device 102 may be out of range of each other to receive signals, indicating separation. Eighth, an entity detection device or Mobile Computing Device 102 may be in range of each other and able to receive Radio Signal Strength Indication (RSSI) data but warning if the signal is weak, indicating distance has increased to some threshold.

Warnings or alerts can be issued from the phone and/or device and/or sent to a multiplicity of receivers such as the phone of the user or the entity detection device 110 and remote users such as security personnel, parents or teachers. The warning can also be displayed by other local devices such as an alarm device or security hub device. The battery usage of the Entity Detection Device 110 is very important to the utility of the invention, as it may not be convenient to recharge or replace the battery. As much processing burden as possible is placed on the Mobile Computing Device 102 to do the more energy consuming activities. The term "polls" is used to indicate checking by radio listening or radio transmitting at a set frequency.

Examples of monitoring mode strategies to detect distance and other event in a battery conservative situation include: Firstly, the entity detection device 110 polls by listening for the regularly transmitting Mobile Computing Device 102 with a frequency appropriate to the risk situation.

Secondly, the device responds the first time it is polled by Mobile Computing Device 102 or Mobile Computing Device 102 changes poll time and thereafter the device only transmits when it loses or the signal from the Mobile Computing Device 102 falls below a certain level or an event is occurs which the devices wishes to communicate to the Mobile Computing Device 102. Optionally no response the first time or on poll time changes is required.

Thirdly, the entity detection device sends messages to the Mobile Computing Device 102 when an event occurs such as the movement of the bags 299. Fourthly, when the entity is moving and the risk is high then the pairing/bonding can be used to ensure that it can keep in regular communication and respond rapidly to distance separation. Fifthly, the entity device turns on at a time as hinted or told by the user for periods of time to monitor or synchronise to any nearby Mobile Computing Device 102 to monitor for events or report to Mobile Computing Device 102 any previously collected and stored information.

BRIEF DESCRIPTION OF THE DRAWINGS

The invention may be better understood with reference to the illustrations of the embodiments of the invention, in which.

DETAILED DESCRIPTION

Figure 1:
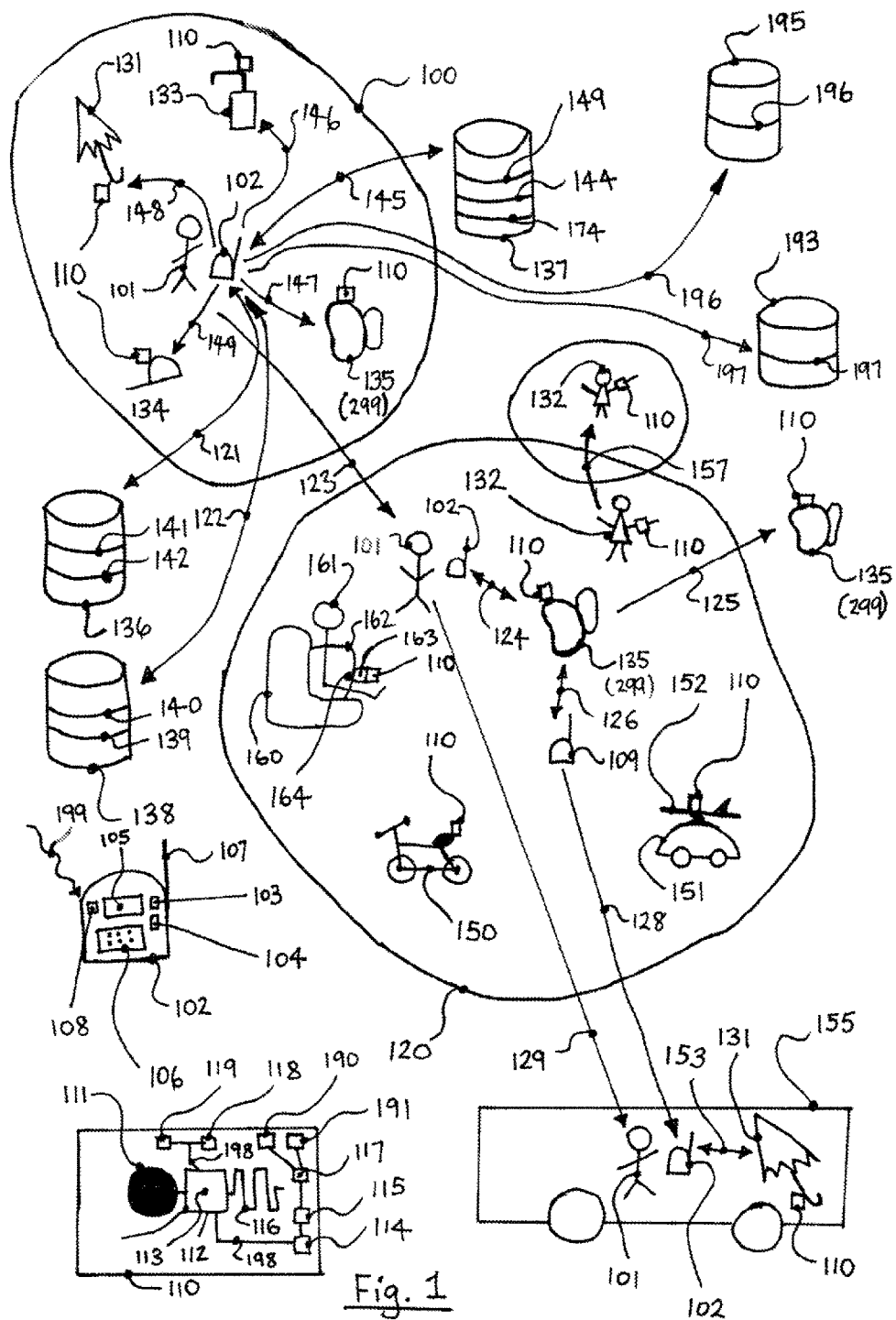
FIG. 1 shows a system for detecting if an entity detection device 110 (and therefore the object it is connected to) becomes displaced from the user.

Potential positions and/or states the system may enter include but are not limited to;

First, the movement or transition of user and mobile computing device 102 between various areas zone but the entity and associated or attached entity detection device is left behind and optionally the entity detection device is required because of situations such as weather causing a warning that the entity is required and should not be left behind. Second, transition between areas or times of various different risk levels requiring changes in the connection frequency between the entity detection device 110 and mobile computing device 102 to be increased for higher risk areas so that the mobile computing device 102 and/or entity detection device 110 can warn the user more promptly in high risk zones if the entity and user are being separated as may happen during theft of an entity.

Third, the movement of entity and associated entity detection device as detected by acceleration and/or gyroscope 119 of the attached entity detection in areas of varying risk levels such as at an airport with higher chance of bags 299 theft. Fourth, the change state of the entity as detected by the attached entity detection device such as the opening of a bags 299 causing the user's mobile computing device to alert the user. Change of state may be an event a panic button operated, PIR detecting a person, bags 299 opened by zip or any such input such as contact switches sensors including but not limited to those used for security systems.

Fifth, the movement of person as measured by a mobile computing device's accelerometer 118 relative to an entity as measured by the entity detection device 110 (by its accelerometer) and warning the user of the potential leaving behind of an item as the user moves and an a wanted object remains un moved. Such a scenario involves for example a user 101 standing up form a seat where an Umbrella 131 (with attached Entity Detection Device 110) was also lying next to the user on the seat. The user moves away from the seat without picking up the Umbrella 131, leaving the Umbrella 131 behind on the bus 155. When the mobile computing device detects movement and communication 153 with entity detection device 110 attached to the umbrella indicates that the umbrella was not moved then the mobile computing device can warn the user. The sensing of movement can be extended from acceleration to include gyroscope 119, compass and also from this information path movements providing a more detail analysis and inference of the kind of movement as well as difference between the movements. The monitoring of acceleration differences can always be on, turned on for zones, or when there has been travel data indicating moving following by stopping by a vehicle as the following moment may be the occasions when item left behind.

Sixth, the transition of the user and his mobile computing device out of the area but another mobile computing device performing the same role and optionally also in a fixed position termed a "hub" 109 automatically or manually takes on the monitoring of the position and/or state of entities and associated entity detection device 110 such as Child 132 with entity detection device 110 operating as a warning bracelet or an entity detection device attached to a a bike 150. When the position or state of the entity changes, the user can be alerted when in range of the hub's low power RF or remotely if the hub 109 can communicate over a fixed or mobile internet network.

Seventh, an entity detection device or Mobile Computing Device 102 may be out of range of each other to receive signals indicating separation. Eighth, an entity detection device or Mobile Computing Device 102 may be in range of each other to receive signals radio proximity signal strength RSSI (Radio Signal Strength Indicator) but of varying weaknesses and hence an estimate of distance including near by through to almost out if range. Deteriorating signal strength can be used to alert a user before the entity detection device is no longer contactable and the entity no possible to track and potentially lost. For example, the Mobile Computing Device 102 transmits a signal of known strength, the Entity Detection Device 110 is programmed to detect the signal when it falls below a set level where the level indicates a distance that still allows the Entity Detection Device 110 at a same or stronger level to respond to the Mobile Computing Device 102 to say the distance has exceeded a specified safe range. The distance and hence transmission and threshold signal strengths can be adaptable according to the area or zone.

The kinds of warnings or alerts can be issued from the phone and/or device and/or sent to multiplicity of receivers such as the phone of the user or the entity detection device and remote users such as security, parent, teacher. The warning can also be displayed by other local devices such as alarm device, security hub device The battery usage of the Mobile Computing Device 102 (which can however often be recharged) but particularly the Entity Detection Device 110 (which can mostly not have the battery recharged and is desirable often not to replace) is very important to the utility of the invention. If the battery usage of the non rechargeable Entity Detection Device 110 is minimised the battery will last long enough that the device may be available for almost same amount of time as battery's shelf life and may even potentially be sealable in one unit.

The emphasis can be given on placing as much burden as possible on the Mobile Computing Device 102 to do the most more energy using transmission and where possible, compared to relatively less energy consuming radio listening and receiving with the entity detection device in the again lower power consumption sleep state for as long as possible being woken up by a timer or Input/Output. The Conservation of energy, especially on Entity Detection Device 110, is affected by the connection frequency between devices as well as the amount of time spent in sleep state. Listening and receiving can take less energy than transmitting by a 33 percent reduction or more. Allowing the Entity Detection Device 110 to enter sleep mode with a timer or Input/Output to wake up is very efficient for the Entity Detection Device 110 whereas bonding or pairing is least favoured for energy consumption but important when devices need to exchange information, compare data without waiting for the establishment of a connection because a quick response time is required. Pairing or bonding is generally a much higher polling/connection rate between device being often at least every 10 seconds.

Given these energy consumption considerations, a various different strategies varying the connection time, and polling frequency between the Mobile Computing Device 102 and Entity Detection Device 110 can be optimised in the following ways so that where possible the Entity Detection Device 110 sleeps as long as possible with optimum polling frequency which still allows depending on the risk of the environment and importance of the equipment to which the Entity Detection Device 110 is connected to protect and monitor where possible minimising transmission and receiving power usage but also allows checking which is frequent enough to notice events such as loss or diminishing of signal or data sent which may indicate that the entity is moving away or being tampered with such as being opened. As one example of optimisation for battery conservation the Entity Detection Device 110 has a timer set for Umbrellas 131 and sunscreen 133 so that the user doesn't need to remember to take at night when it would be a waste of time to turn on monitoring.

Broadly, Polling is the process of one device transmitting a signal at a set frequency to which a second device may receive. The second device may be designed to respond to the first device, each time polled when it receives the signal to indicate to the first device that it is still present as one example, where the response may consist of data also to communicate. A disadvantage of polling is second device needs to be listening and also the first needs to transmit regularly without being aware if there is any need. Polling can be optimised by having the agreed synchronisation time bands using synchronised clocks where the process occurs with both devices sleeping at other times. The synchronisation time can be varied.

Polling can also alternatively be the process of listening for an expected or in case a signal may be set at set frequencies and times for a second device. A given device can both simultaneously perform both transmitting and receiving polling. In another variation the second device only responds when it has information to send, reducing the need for transmission.

The second device could also tell the first device to stop monitoring when it is about to leave the zone where it can communicate to allow the first device to stop monitoring. An alternative approach is event based involving the first device listening for the second to transmit when an event occurs such as the movement of the bags 299. This does however require the first device to be listening often (though again synchronisation strategies can also be used) but means that depending on the event being monitored this can be combined with timed synchronised checking so that the first device does not need to be listening all the time. Operating systems such as iOS7 monitor for Bluetooth Low Energy signal related events to be triggered by the locationManager depending on the detection (didEnterRegion) and loss of signals (didExitRegion)

Some non limiting examples of monitoring mode strategies to detect distance and other event in a battery conservative situation include:

Firstly, the entity detection device 110 polls by listening for the regularly transmitting Mobile Computing Device 102 with a frequency appropriate to the risk situation listening with a polling frequency which is in synchronisation to the Mobile Computing Device 102 polling transmitting from Mobile Computing Device 102 then the Entity Detection Device 110 transmits a response every time it is polled or every certain number of times, from which the Mobile Computing Device 102 or Entity Detection Device 110 can calculate the signal strength such as RSSI and so distance and take any required action as configured by the system such as reporting if the distance exceeds some amount.

The transmission by the Mobile Computing Device 102 can always be on or it can be optimised to poll in at times synchronised with an extra error range also configured. If the transmission is on then if for example the Entity Detection Device 110 detects movement it does not need to wait polling frequency before reporting.

As the Mobile Computing Device 102 moves into areas or Entity Detection Device 110 increased acceleration with increased risk it can communicate to the Entity Detection Device 110 to increase the polling frequency.

Secondly, the Entity Detection device 110 starts monitoring from the first time it is polled by Mobile Computing Device 102 and when the signal is lost or below certain level or event occurs it alerts the Mobile Computing Device 102 while it can still respond to the Mobile Computing Device 102 because it is in range. The transmission strength of the Mobile computing device 110 and/or the threshold after which to consider the signal it too low or distance should be set so that when the level is reached, the Entity Detection Device 110 has sufficient transmission strength to be able to contact the Mobile Computing Device 102 and alert. While this method has the advantage that the Entity Detection Device 110 listening mostly with little transmission, but relies on assumption that the Entity Detection Device 110 will always have an opportunity to respond before being out of range. Optionally the Entity Detection Device 110 may also transmit to warn the Mobile Computing Device 102 if the Entity Detection Device 110 moves near to another fixed or variable Mobile Computing Device 102 and moves close in range used to indicate the outer perimeter of a safe are mean time assume it is ok.

The Entity Detection Device 110 can optionally responds the first time it is polled by Mobile Computing Device 102 or when the Mobile Computing Device 102 changes poll time.

The system can also be designed so that unless the Entity Detection Device 110 transmits and until the Entity Detection Device 110 detects that it has left or is leaving the receiving range of the Mobile Computing Device 102 the Entity Detection Device 110 is present and monitoring, has not responded presently as nothing to report but will transmit if an event occurs.

Thirdly, the entity detection device send messages to the Mobile Computing Device 102 when an event occurs such as the movement of the bags 299. The Entity Detection Device 110 detection device can be in sleep mode until the accelerometer 118 detects movement and then transmits the event. The Mobile Computing Device 102 needs to be able to listen for such events. For example, in the case of iOS operationg system, the LocationManager:didEnterRegion can be used by the software to detect a signal is sent by the entity detection device.

Circuitry such as capacitance and/or counters and timers can be used to monitor for a certain amount of movement before waking up the Entity Detection Device 110.

Fourthly, when entity is moving or can be moved quickly measured by the accelerometer 118 and/or the Mobile Computing Device 102 using position information such as GPS that the risk is high then the pairing (bonding) can be used to give immediate communication access between the devices. Fifthly, the entity detection device turns on at a time as hinted or told by the user for periods of time to find time to monitor or synchronise to any nearby to monitor for events or collecting previously collected and stored information. Sixthly, the separation of an entity and associated transmitting entity detection device from a mobile computing device 102 can be detected by event handlers in the software in the mobile computing device after the devices have come in range of each other, for example, as detected for iOS by the locationManager:didEnterRegion event, by the monitoring on the mobile computing device of the event of the loss of signal event, for example, as detected for iOS by the locationManager:didExitRegion.

Seventhly, the presence of an entity or information communicated by an associated entity detection device transmitting can be detected by event handlers in the software in the mobile computing device 102 for example, as detected for iOS by the locationManager:didEnterRegion event, by the monitoring on the mobile computing device of the event of the loss of signal event, for example, as detected for iOS by the locationManager:didExitRegion. Eight, the entity detection device pairs with the mobile computing device when the mobile computing device is detected and remains paired or alternatively, the entity detection device periodically polls by transmitting to mobile computing device so that the mobile computing device can calculate its distance and receive any information from the entity detection device. This uses more battery on the entity detection device particularly depending on the polling frequency for transmission from the entity detection device.

As an alternative to the use of radio signals and the calculation of signal strength and from this then estimation of distance, physical sensors including but not limited to accelerometers, compass and gyroscope 119 as well as other sensors that can add can be used to augment the accuracy of these distance measurement taken from radio waves or used instead. These physical sensors can also be used to completely replace the use of radio based distance estimation. For example, in the example of the case of the movement of a bags 299 the physical movements can be used estimate and detect if a bags 299 has been moved by detecting sustained paths and paths of certain characteristics indicating movement. These paths may consist of a vector of measurements which may be pre recorded paths to identify as indicating events such as the lifting of a bags 299, standing up or sitting down of a person as a few non limiting example. Paths may also be specifically matched to a location or starting or ending position. For example, in the case of the detection of shop lift/shop theft the system know it's starting position for example by being programmed or acquiring this from internal positioning IPS using for example low power RF beacons such as bluetooth or GPS may use the physical sensor system to estimate it's new location as it is moved and optionally also using map or other information deduce it's new position and if for example the new position required a warning to be generated for example perhaps indicating being near the exit door indicate that as the device has not been removed by a sales assistant a theft is occurring.

In this case of leaving the house, a user's regular movements of accelerations, compass and gyroscope 119 and IPS path calculation can be used combined with events such as the loss of a WiFi connection or bluetooth beacons, or other networks detected by the Mobile Computing Device 102 or the acquisition of GPS indicating outside or reliable, consistent acquisition, and/or movements indicative of moving in a vehicle or walking combined with time can be used to determine if the user has left the house or any other zone. If the act of leaving the house is detected, the mobile computing device 102 can check if the Entity Detection Device 110 can be connected to, and/or, the separation distance using Bluetooth Low Energy functionality or other RF technology. In this way, as the entity detection device 110 is attached to entities that are required by the user when leaving home such as a hat 134, sunscreen 133, Umbrella 131 this system can remind the user to take them if they are about to leave them behind.

Additionally, checks can be done to determine if an Entity Detection Device 110 is present in the house early. Additionally, Mobile Computing Device 102 can contact and monitor for the Entity Detection Device 110 and when the signal goes out of range this can also be used to determine of the Entity Detection Device 110 is being let behind. This indicator of potentially leaving behind the Entity Detection Device 110 can be combined with other described indicators that the user has left the house or other zones. The kind of movement such as identification of movement in different forms of transport for example car or bus and whether walking and at what speed can be deduced and used to determine the risk level and hence polling frequency. In addition to locations, areas and zone where different levels of risk can be assigned the activity or mode of transport a person currently using or experiencing can be used to assign risk factors The sensors can be positioned on the entity detection device and the Mobile Computing Device 102 in a multiplicity of orientations and in any number to calculate as physical properties in all directions and angles.

GPS and other forms of positioning can also be used to the kind of activity or transport some one is current experiencing. For example the speed of movement may indicate, or path and these used to determine a risk level and hence monitoring modes and polling frequency appropriate to the situation.

Referring to FIGS. 1, 2, 3, 4, 5, 6, 7, 8, 9, 10, 11, and 12:

A mobile computing device 102 consisting of a processor and radio 103, software 104, display 105, keyboard 106, antenna 107 and accelerometer/gyroscope 108. Functions described in this disclosure involve information being sent, received or processed may be implemented by the software 104. The processor and radio and antenna shall be able to communicate in or by, but not limited to, low power RF such as Bluetooth, and Bluetooth Low Energy (Bluetooth 4) as well as be able to communicate using other forms of WiFi, mobile network communication, internet, SMS, and wire and cable as some non limiting examples. The Mobile Computing Device 102 also includes a battery. Example mobile computing devices 102 can include but are not limited to iPhone, Android, Smart Watches, Tablets, laptops and the like.

The mobile computing device 102 can transmit and receive from an area 100.

Functions described in this disclosure involve information being sent, received or processed may be implemented by the software 104. The processor and radio and antenna shall be able to communicate in but not limited to low power RF such as Bluetooth, and Bluetooth Low Energy (Bluetooth 4). The Mobile Computing Device 102 also includes a battery. Example mobile computing devices 102 can include but are not limited to iPhone, Android, smart watches, tablets, laptops and the like.

The mobile computing device 102 can also be iWatch, smart watch, iPhone, iPod, iPod, tablet, Android, Windows or other operating system based device or other such devices. An individual or group may own a set of these and wish for them to be kept from being lost.

Software in the Entity Detection Device 110 and Mobile Computing Device 102 as an application that can run in foreground and background can perform operations described to implement the monitoring modes and alerts and other computations. The mobile computing device 102 also contains a battery which may also be recharged by connection to a mains power. The processor, radio and software on the mobile computing device 102 an the entity detection device 110 device 110 use low power RF communication protocols including Bluetooth Low Energy (also known as Bluetooth 4 or Bluetooth smart).

Optionally, a compass may also be included in the mobile computing device

An entity connected to the Entity Detection Device 110 and the user caries the Mobile Computing Device 102. There can also be fixed also referred to as a "hub" and/or temporary Mobile Computing Device 102 "hub". An example Mobile Computing Device 102 acting as a temporary hub could be a mobile phone put inside a backpack in a hostel where the bags 299 has Entity Detection Device 110 embedded into the bag for example which could tell the owner remote to the hostel.

The Entity Detection Device 110 consists of a processor 112 with software 113 which can run programs, including but limited to monitoring inputs, aggregation, storage and communication of measures and receiving of status to display visually 114 or audibly with an alarm or sound generator 115 as well as communicate using lower power RF Bluetooth, and Bluetooth Low Energy (Bluetooth 4) using an antenna 116 and powered by a battery 111 that is often but not limited to being small and non-rechargeable such as a coin battery. The sensor device has an accelerometer 118 and/or gyroscope 119 sensors, input/output ports 117 for interfacing to sensing and contact switches 190 as well as output ports 191. Components of the entity detection device 110 are wired to the processor 112 by the electrical contact wire 198.

The input and output ports 117 may use a variety of protocols including I2C, 1—wire, etc. All possible types of of input sensors 190 measuring physical properties, including, but not limited to pressure, magnetism, water content and movement may be connected to 117. All possible types of output 191 may be connected to 117. With reference to the entity detection device 110 at the time of writing this description the Texas Instruments cc2540 is one example processor 112 which also includes a software stack for Bluetooth Low Energy which is a component of the overall software 113.

Optionally, a compass may also be included in the entity device. The entity device is equipped with a processor which can use different amounts of power depending on whether it is in the listening for devices, receiving, transmitting, sustaining a pairing or bonded connection, or sleeping. When the device is sleep it is used limited power and can be "woken" from the sleep state by a timer which can be used to tailor the frequency with which the device wakes up and so uses more energy based on the circumstance, risk level and so reasonable frequency or amount of time to wait between each time the processor wakes ups and listens or transmits. In the case of the Entity Detection Device 110 it is optimal to choose a monitoring mode wherein the Entity Detection Device 110 minimised transmissions and performs listening in by polling at a certain frequency between which the processor sleeps and in this configuration only transmit when an event occurs. The Entity Detection Device 110 can also be equipped with accelerometers and other input output sensor devices. These can be used to provide a signal that wakes up the processor to avoid the processor needing to wake up periodic to check these sensor devices.

Typically, for an entity using low power RF such as Bluetooth 4, to transmit takes most power, to be listening or receiving less power and to sleep till woken up by devices such as accelerometer 118, still less power including the accelerometer 118 or other such input/output devices power needs, while sleeping and awaking on a timer the least. Transmitting with Pairing or bonding typically has a bonding time of at least ten seconds and so uses more energy and is to be avoided if one of the other strategies can be utilised The Strategy is to reduce the time awake (not in sleep mode), limit receiving, polling for listening time, really reduce transmission time which uses the most power including a higher peak load.

In order to determine whether an entity detection device 110 is detectable by a Mobile Computing Device 102 as well as ascertain the distance and while minimising power a multiplicity of techniques can be employed previously described monitoring modes where the Mobile Computing Device 102 controls the polling listening frequency of the Entity Detection Device 110 and minimises the need for the Entity Detection Device 110 to transmit as well as maximise sleep and attempts to use acceleration and other Input/Outputs as a method to wake up the Entity Detection Device 110 wherever possible. "Polling listening frequency" refers to the frequency with which the Entity Detection Device 110 or also Mobile Computing Device 102 wakes up the processor and listens for transmission from another device. "Polling transmitting frequency" refers to the frequency with which the Entity Detection Device 110 or also Mobile Computing Device 102 wakes up the processor and transmits for another device to receive. In all cases of polling optionally the processor may already be awake and so not need to wake up first as described.

In all the cases the frequency that the can be determined is determined by zone, time, acceleration, or user setting of preference or the user wishing to say when turn on temporary different monitoring. Depending on the entity being monitored time has a large effect on the frequency of checking, for example during night unless it is a regular occurrence, there is little point in checking if a user is leaving before 5:00 in the morning so the Entity Detection Device 110 can be configured for the night interval for an Umbrella 131. Acceleration for example can be used to determine whether an Entity Detection Device 110 should wake up and warn the user, for example in the case where a bags 299 is moved the detection of the acceleration could be used to wake up the Entity Detection Device 110 that transmits a signal to the Mobile Computing Device 102 to indicate that it has been moved, and when the Mobile Computing Device 102 finds it is not moving or to the same extent an alert can be triggered on the Mobile Computing Device 102 and/or the Entity Detection Device 110.

One primary advantage of the prolonging the life of a battery is to increase the battery length to be such that the Entity Detection Device 110 can be designed at cheap cost or more durability or water proof without a battery replacement section in the casing. A database of weather information 136 collected from various sources which can be accessed by the user's 101 mobile computing device 102 holds current, past and predicted UV values 141 and weather values including for precipitation 142.

Entity Detection Devices 110 connected to entities such as umbrella 131 and sunscreen 133 and hat 134 whose need is determined by the UV radiation for the day 141 or weather conditions 142 for the day can in addition to the mobile computing device 102 receive this data to enable them to co-operate along with the mobile computing device 102, as discussed in the monitoring modes, in the process of reminding the user to take the items when the UV and weather conditions require. For example the polling transmission of listening frequency for an umbrella or sunscreen may be increased when the UV data 141 for the day is high.

A database of locations and associated risks 138 can hold records for different locations containing geographical coordinates, a list of transmitters detectable in an area or other indicators and an associated risk level. The risk levels may also vary according to time. The risk level may be expressed for example as one non limiting example as a percentage. One example record could be for an airport 140 where because of the high number of people, thefts and other issues as tired users 101 the risk is high at perhaps 10 percent. An other example record could be for an office 139 where the risk is low 1% during the day but high 10% if any items are left unattended. As discussed in this description, including as monitoring modes, zones and areas with different risks are important in the determining the operation of the system this information is stored in the database 138 and can be used Other high risk locations include universities, school and gym locker rooms and hotel rooms where keys may have been duplicated. A database of entity profiles 137 can hold information of characteristics of individual entities that should be taken into consideration by the system during operation for example, how much acceleration activity is required before movement to be detected for example in the case of a bag, just knocking a bag should not cause it to alert that it is being stolen in some situations. Other identification information such as users associated with an entity as some non limiting examples. Additionally for entities how often to alert, how to alert and how much before to alert. Many other configurations settings could be contemplated depending on the entity.

Weather and UV information 136, via low power RF communication 121 can be communicated to the mobile computing device 102, and to the hat 134, 101 via low power RF communication 149, to the umbrella 131, 101 via low power RF communication 148, to the sunscreen dispenser 133, 101 via low power RF communication 146. Zone or area and associated risks information 138, via low power RF communication 121 can be communicated to the mobile computing device 102, and to the hat 134, 101 via low power RF communication 149, to the umbrella 131, 101 via low power RF communication 148, to the sunscreen dispenser 133, 101 via low power RF communication 146, to the child 132, 101 via low power RF communication 146, to the bag 135, 101 via low power RF communication 146.

Entity profile information stored in the database 137 can specify for an entity, it's ID, and characteristics such as how much movement and other tampering and actuation before an alert, as well as differences according to the location and time, as well as who to contact and what alerts to generated. In addition to profile for a bag 175, a record for an umbrella 174 and sunscreen 144 are some other examples. In the case of the sunscreen, it may also specify that if the sunscreen was detected to have been applied, then do not warn the user when leaving the house as well as allow as days of the week to be excluded from the reminder for example if the person is an office worker so that it will only be active on the weekend.

Entity profile information 137, via low power RF communication 121 can be communicated to the mobile computing device 102, and to the hat 134, 101 via low power RF communication 149, to the umbrella 131, 101 via low power RF communication 148, to the sunscreen dispenser 133, 101 via low power RF communication 146, to the child 132, 101 via low power RF communication 146, to the bag 135, 101 via low power RF communication 146.

In the situation of being at home and noticing that the user is moving 123 away the system checks to see if any entities that are desirable to take are being taken.

The system described allows a user 101 to be provided with various alerts when the entities such as umbrella 131, child 132, hat 134, sunscreen dispenser 133, or bag 135 (depicted in detail in FIG. 2 as 299) or any other desired object attached to entity detection device 110 move out of range or further away a mobile computing device 102. Initially devices are in listening mode configurable time or some factory setting for example every 10 minutes, every hour, or when a configuration button for the purpose of allowing configuration is activated. The mobile computing device 102 such as an iPhone sends a signal which is received after the said configuration time period or when the configuration button is pressed to set the Entity Detection Device 110 into configuration causing the device to temporarily listen and receive data from the Mobile Computing Device 102 while configuration settings set.

In the configuration mode, the mobile computing device such as a phone, then transmits preferences such as listening polling frequency times including using default values, or values for various levels of battery usage. For example, times for the device to wake from sleep mode could be set to 6:00 am the earliest someone would leave for work and need to be reminded to take. The Mobile Computing Device 102 can also monitor times when the user leaves the house or other zones using course GPS changes such as acquiring the GPS when leaving the house and/or position changes, radio triangulation for mobile towers when leaving the house and/or position changes, WiFi signals and other radio signals including Bluetooth Low Energy beacons when leaving the house are lost, and use these to adapt the times that the device is turned on to listen by uploading these configuration preferences to the device.

The Polling time between the Mobile Computing Device 102 and Entity Detection Device 110 can be selected for a given frequency synchronised according to a set time. Polling times are set according to the hazard of the area, time of day, weather.

In addition to the Entity Detection Device 110, the Mobile Computing Device 102 can also turn off or disable in a similar manner to the Entity Detection Device 110 its monitoring modes and functions to reduce power usage and improve Mobile Computing Device 102 performance when unnecessary monitoring is not required.

The Mobile Computing Device 102 monitors to determine when the user leaves the house including for example any combination of indications including also time. The system also can learn over time what these combination of indicators are as well as being trainable by the user or automatically noticing potential Patterns of accelerometer 118 and gyroscopic recordings and paths can also be used solely or in combination with other indicators. The acquisition of one or more of GPS signals, including course GPS, radio triangulation for mobile towers as the user moves out doors, the loss of home WiFi signals, or acquisition of external and other radio signals including Bluetooth Low Energy beacons and use these to adapt the times that the device is turned on to listen by uploading these configuration preferences to the device. A later indicator may also include the movement of the car if the user starts to drive away.

Optionally at the time the Entity Detection Device 110 and Mobile Computing Device 102 wake up or at some point prior to leaving 123 the Mobile Computing Device 102 establishes whether the Entity Detection Device 110 is present so that if not present there is no need to later warn the user. If the user has Entity Detection Device 110 connected to items which are only sometimes needed depending on variable circumstances, then the Mobile Computing Device 102 will check each day whether the item is required, for example if an Umbrella 131 is an entity that the user has then the Mobile Computing Device 102 will check for a rain prediction so that it will not need to later remind the user to take the Umbrella 131 if it will not rain. In a similar way if the user has hat 134 and/or sunscreen 133 and/or sun glasses, then the Mobile Computing Device 102 will check whether the UV readings will be high for the day as if UV will be low there will not later be a need to remind the user to take these items.

For example, time such as Days of the week certain items like a sports bag 299 may be important to take. This can be configured in a calendar on the Mobile Computing Device 102.

When the Mobile Computing Device 102 determines it and the user has left the house as described, and it finds always or optionally only when additional weather, time or other criteria are fulfilled, it either transmits to the Entity Detection Device 110 to respond so that it can measure the transmission strength of the signal from the Entity Detection Device 110 and/or begins listening polling for the Entity Detection Device 110 to see if it transmits and confirms it is also moving or has very recently.

If the Entity Detection Device 110 has been moved as sensed for example an accelerometer 118, then it will increase it's listening polling frequency or transmission polling frequency to tell the Mobile Computing Device 102 that it is being moved.

By these various methods, the Mobile Computing Device 102 receives a measurement of the signal strength and hence distance of the Entity Detection Device 110 in relation to the Mobile Computing Device 102 and if it is not a close distance or the user and Mobile Computing Device 102 moved but not the Entity Detection Device 110 and by these means that the entity has not or may not have been brought then an alert that the entity has been left behind is issued on the Mobile Computing Device 102 and/or the Entity Detection Device 110.

If time and conditions indicate that the item should be taken and not forgotten then an alert is generated to the Mobile Computing Device 102 and/or Entity Detection Device 110.

A range of additional rules could also include checking that if a sunscreen 133 has already been applied then the user may not need to be reminded to bring it.

In one situation the user begins in a home zone 171 (as indicated by being within range of a Bluetooth network or beacon, Bluetooth Low Energy network, signal or beacon, WiFi local network 100 or at a given position determined by GPS and radio tower positioning), when the user leaves home as indicated by loss of connection or weakening of signal from these networks, beacons or signals, or a detected increase in distance measured by Bluetooth Low Energy proximity function, as measured by the mobile computing device 102, then an alert is provided as the user (with associated 102) and object (with associated 110) move away from each other according to settings in a database 137 for each entity. In the case where sunscreen has not been applied as detected by the entity detection device 110 (having failed to receive a dispense detection), then when the user is detected to have left home 171 without applying sunscreen so is at risk of sunburn an alert is given not to leave the sunscreen behind. In the case where the sunscreen has been applied sunscreen it may still be important to ensure that the sunscreen is taken as it may need to be applied later so an alert may also be given not to leave the sunscreen behind. In the database 137 a record 175 for bag 299 may specify days of the weak a sports bag 299 or laptop bag 299 should be taken. On these calendar days according to the record for the bag 299 if the bag 299 is required the user is alerted. The configuration information for the bag 175 in the database 137 may also include information such as which users should be contacted if an alert occurs in relation to the bag 135 as well as much movement and/or opening according to different locations and times (and hence risks) is to be recorded before an alert is generated as well as after what distance the bag is to be considered to be out of safe range and an alert generated. Configuration settings for an umbrella 174 could set the locations with high risk of forgetting and so more frequent monitoring as well as safe distance or difference in movement that would trigger an alert and how the alert is displayed whether in the mobile computing device and/or the entity detection device mounted on the umbrella.

The software on the application can be trained by taking allowing it to record the events that occur has it leaves the house in terms of changes.

When user and entity leave home the emphasis on protection moves from forgetting to take from a safe environment where inconvenient rather that getting lost to one where get lost or stolen.

Database can use pre exist zones and hazard levels and/or user can also define their own with the zones and hazard levels where the software on the mobile computing device can also notice common locations and ask for a rating. Crime statistic maps providing by police may be one source where geographic locations and areas have associated crimes statistics from which given a coordinate a risk level for different levels of personal and property safety can be looked up.

Users voting on crime safety based on areas they feel safe and/or times they turn on for example a panic alarm into stand by mode or use a panic alarm can also be combined into a database.

The zone the user and Mobile Computing Device 102 Entity Detection Device 110 is in is determine from GPS, WiFi, radio position, Bluetooth as determined by the mobile computing device. The zone with corresponding hazards and coordinate and geometry is looked up database 138. The polling time is retrieved by using GPS lookup from phone to lookup to find risk.

The device can also determine an area using an low power RF signals such as Bluetooth Low Energy available. The polling time and monitoring mode including also bonding or pairing is varied according to zone and/or if the Mobile Computing Device 102 and/or Entity Detection Device 110 are moving and/or also time. For example, if moving there is a greater risk of a child 132 and parent, or bag 299 and person being quickly separated for example, if travelling on a train or in a busy station then so this increased risk triggers a more frequent communication between the devices established to ensure that separation or opening of a bag 299 is quickly identified.

The listening polling could be done with the bag 299 listening and only transmitting an alert if the signal strength and hence distance is reduced below a certain level indicating for the risk level the distance of separation is concerning or acceleration and other movement indicate concern that the object is moving away quickly. Optionally, also in listening mode the Entity Detection Device 110 may let the Mobile Computing Device 102 know the device is still present by issue occasional transmissions from the Entity Detection Device 110. This style of occasional transmission or heart beat as well as allowing the locating of the device also provide some protection against a thief attempt to shield or jam any alert signals from the Entity Detection Device 110 as the Mobile Computing Device 102 can detect the lack of a regular heart beat as an alert condition. Again the heart beat can be varied according to the desired battery usage needs and safety of the location and movement.

The frequency of connection between the Entity Detection Device 110 and Mobile Computing Device 102 may be even increased to that pairing with polling in the range of seconds which does have advantage of instant communication of distance as well as passing of acceleration movements which if zone hazard high and both items not acceleration in unison or individually indicate potentially for example, a bag 299 is being moved away from the user which may be helpful in high risk areas where a thief may take away an object while the user is busy and there are so many people around that it is difficult to notice the theft is occurring.

The parent can define a play park setting in the play park 137 with a set distance of separation between the Mobile Computing Device 102 and Entity Detection Device 110 after which an alert is generated. This is helpful even if the child 132 is still around but just out of sight of the parent which is annoying for the parent to keep on checking. The Mobile Computing Device 102 which has a larger and also rechargeable battery source transmits constantly or at assigned frequency intervals which can also be synchronised with the Entity Detection Device 110. When the distance between the Entity Detection Device 110 and Mobile Computing Device 102 pass a threshold that is still close enough that the Entity Detection Device 110 has the ability to transmit to the Mobile Computing Device 102 the Entity Detection Device 110 will alert the Mobile Computing Device 102 the child 132 is getting out of range. In this way, the Entity Detection Device 110 uses listening polling to notice the transmission from the Mobile Computing Device 102 and calculates the signal strength and estimates a distance, avoiding the need to transmit often.

As previously described a heart beat transmission depending on the risk in the area or zone could also be combined with this approach. If the heart beat is frequent enough this could replace the need for the Mobile Computing Device 102 to transmit and the Mobile Computing Device 102 would calculate the distance from the signal strength from the Entity Detection Device 110 and warn when it falls below a certain level and so a predicted distance. Additionally a pressure sensor or contact switch, or heart rate, including heart beat signature could be used to ensure that the child 132 still wearing an alert also given.

In one embodiment, all the communication between the mobile computing device 102 and entity detection devices 110 is via Bluetooth Low Energy signals or other low power RF.

The system described also allows a user 101 to receive alerts if an entity such as a bag 135 (299) is moved such as when being picked up, being moved away from the user and so mobile computing device, opened as measurable by acceleration and gyroscopic calculations particularly with reference to the hazard of the area relating to location and/or time as well when the user selects closer monitoring of the entity.

Again the zone area, movement time, will determine how often again polling transmissions signals are sent. By controlling these variables unnecessary battery can be reduced. The polling time can also be varied by user at request following at the next opportunity that the device synchronises when for example the Mobile Computing Device 102 polls the Entity Detection Device 110 a new polling frequency at user request because the user feels a zone is unsafe or by looking up the user, Mobile Computing Device 102 and Entity Detection Device 110 current position and on noticing the risk level in a database is high setting a fast polling frequency.

For example, when one a bus 155, train or plane and the user leaves luggage to go to the toilet, then in order to ensure that he is aware if anyone opens or moves his bag 299 while he is in the toilet and Entity Detection Device 110 monitors the bag 299. An alarm and/or flashing display may also be given to deter an attack in addition to the alert being sent to the user's Mobile Computing Device 102. The bag 299 may also have insignia (such as a trademark) or a display that flashes or in other ways indicates that the bag 299 is protected by this system as a deterrent to thieves. In another example, a user may have a bag 299 stowed under a bus, when the bus stops and the user is on the bus separated from the bag 299, if the bag 299 is moved significantly more, for a prolonged time or in a consistent paths that may indicate the bag 299 by accident or theft is being carried away as determined by accelerometers and gyroscopes and other sensors, and optionally the same movements are not being made by the Mobile Computing Device 102 with the user.

In order to achieve this the Mobile Computing Device 102 and Entity Detection Device 110 both monitor acceleration patterns. The user may either be aware of this risk knowing that while he cannot get off the bus and the bags 299 are being taken out he can do nothing to know if someone has his bag 299. If a difference in acceleration is noticed then the user is warned via his Mobile Computing Device 102 and he can remotely activate an alarm on the Entity Detection Device 110 or an alarm on the Entity Detection Device 110 may be activated automatically.

Or the previous travel acceleration on the bus or by some other information the system may know the that the bag 299 has been travelling on a bus that is now stopped and this analysis may be performed automatically for example when the bus is stopped for a period of time.

Additional heuristics can be employed to detect if the Mobile Computing Device 102 has no accelerations at all indicating that the user is not holding the Mobile Computing Device 102 so that comparison of movements of the Mobile Computing Device 102 and Entity Detection Device 110 is not to be made.

Figure 2:
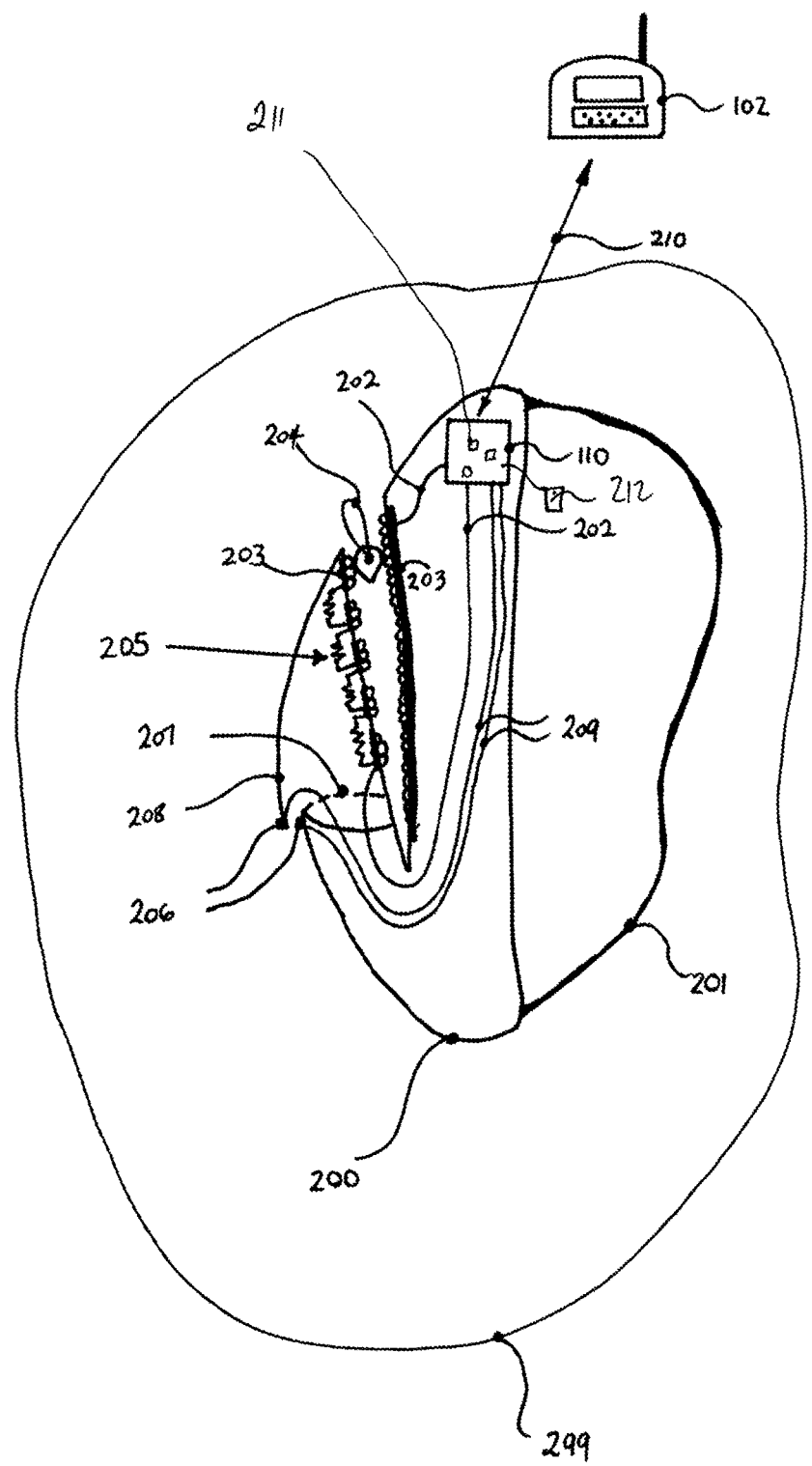
FIG. 2 shows the connection of contacts to an entity detection device 110 attached to a bag 299 allowing detection of the opening of the bag 299.

Referring to FIG. 2, The system can detect if an entity such as a bag 200 with bag strap 201 has individual components opened such as the opening of a pocket flap 208 to take items from the inside of the pocket 207 where the opening separated two magnetised switch contacts 206 which are normally kept closed by the magnets. The circuit if completed connecting the components 203, 204 and 205 to the entity detection device 110 by electrical conductor 202.

As an alternative to magnets press studs or other mechanical methods can be used to close the pocket. The circuit if completed connecting the components 206 to the entity detection device 110 by electrical conductor 209. The system can additionally detect if an entity has individual components opened such as the opening of zipper section which conducts 203 which is done by passing a current through the conducting component 203. The zipper tag 204 which conducts can act as a pivot on a potentiometer with varying the resistance 205 between sections 203 along one side of the zipper as it is moved back and forward. The circuit if completed connecting the components 203, 204 and 205 to the entity detection device 110 by electrical conductor 202.

Alternatively Sets of one or more plates measuring capacitance across the opening of the bag 299 may also be employed. A magnet and magnetometer to measure the change in magnet strength from the magnet or alternatively a reed switch between two sides of the bag 299 may also be employed to detect the opening of the bag 299.

The entity detection device 110 in the bag 200, can communicate an alert to the mobile computing device 102 via low power RF 210 such as Bluetooth energy when movement or opening of the bag occurs as well as the bag being detected to be leaving an area. Additionally the display 114 and audible 115 components on the entity device 110 can create alerts. The bag 200 containing the entity detection device 110 may be monitored by a mobile computing device 102 by according to said previously described monitoring modes.

Figure 3:
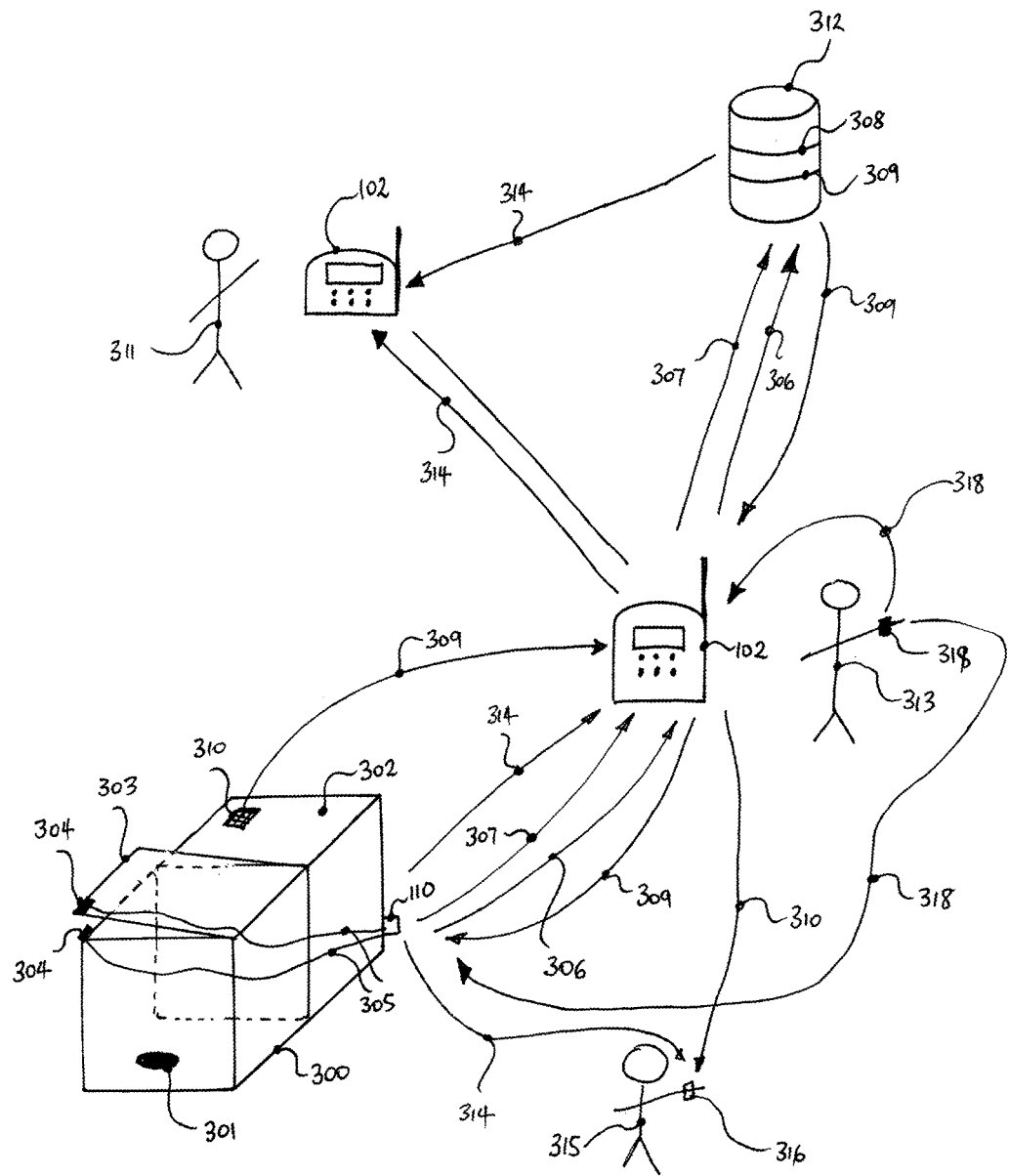
FIG. 3 shows a pill box 399 which has compartments monitored by contact switches and the whole box by an accelerometer 118.

Referring to FIG. 3, a pill box 399 is depicted with individual compartments 300, and a second compartment 302 of an optional multiplicity that can be included, and a lid 303 for each compartment which has switch contacts 304 on the lid and compartments where the switch contacts 304 are connected by wires 305 to the Entity detection device 110. Each compartment contains medicines 301 for example pills which are to be taken at different times of day. Although only two compartments 300 and 302 are shown the pill box may have any number of compartments with multiple for one day and this configuration repeated for multiple days. The entity detection device 110 attached to the pill box 399 also has an accelerometer 118 which can detect when the pill box is moved and even small movements corresponding to the opening of a compartment lid 304. The entity detection device 110 can communicate 306 with the mobile computing device 102 when the pill box is moved as detected by the accelerometer 118 or by the opening of the contact switches including which contact switch and so for which time period the medicine has been taken. The monitoring modes determining the poll time and hence energy usage is selected by location, time or user choice. In one configuration the mobile computing device 102 performs polling to listen for the entity detection device 110 mounted on the pill box. The polling listening for signals from the pill box can be optimised to be only performed at the times when the user should be opening the pill box allowing for some extra time before and after the time when the user should have taken the medicine. If the mobile computing device 102 including as a hub 109 does not receive communications from the pill box 399 within the correct period of time as determined by medication instructions 309, then it can remind the user requiring the medication 313 via display 114 or audio 115 on the pill box or by sending an alert 314 sent to the mobile computing device 102 of the user 313. If the user 313 does not respond then an alert 314 can be sent via the mobile computing device 102 with access to internet, SMS, email or other means to a remote person 311 with a mobile computing device 102 who can contact the user and see why they have not taken their medicine and that they are OK. This remote person 311 may be, for example a nurse or family member. The alert 314 indicating that the medicine has not been applied can also be sent to a remote server 312 where it can be stored or logged as results 308 for later analysis for use by software on the remote server 312 which can also generate alerts 314 to remote users 311.

The correct period of time at which the user should take the medication may be determined by scanning a QR code or bar code 310 on the medicine bottle or packaging as some non limiting examples. The code 310 can be scanned by the mobile computing device and information in this code 309 or by looking up the medication times 309 on the remote server and other instructions 309 can be used by the user's 313, 311 mobile computing devices 102 and/or entity detection device 110 and/or remote server 311 running software to monitor and know based on the instructions 309 the time to expect either a dispensed event 306, heartbeat without dispensed event 307 and/or the alert 304. When none of the signals 304, 306 nor 307 are received within the correct time then the absence of these signals in itself constitutes an event indicating that no administration of medication has been performed.

To allow monitoring software on the user 313's mobile computing device 102, monitoring software on the remote server 312 and/or monitoring software on the remote user 311's mobile computing device 102 to have more ability to determine why the alert 314 was not generated, in addition to the no medicated alert 314 the dispensed event 306 as well as heartbeat 307 information signals can be provided to one or more of the the user 313's mobile computing device 102, remote server 312 and remote user 311's mobile computing device 102.

Software in user 311's and user 313's mobile computing devices 102, or the remote server 312 can use the signals 306 and 307 to provide extra detail about medication activities in addition to simply relying on an alert 304 when the medication has not be taken. These extra signals also allow the calculation and alerting to be performed on devices other than just the entity detection device.

If a mobile computing device 102 or remote server 312 have monitoring software using the medication information 309 to determine whether a user should be reminded to take medication, then provision of a dispensed event 306 will alert when no reminder is required, however, if no dispensed event has occurred it may be possible that the medication has been taken but in the case of the monitoring being performed from the remote server 312 or mobile computing device 102 of user 311, the mobile computing device 102 or user 313 may not be in range with the entity detection device 110 but the medication may have been taken. The absence of a heart beat signal 307 will indicate this state the monitoring software could then alert the user 304 that the pill box 300 and entity detection device 110 are not in range of the mobile computing device. It is also possible a broken communication link between devices is causing the heart beat and dispensed signal not to be received or a device has no power or is turned off. If a heartbeat signal is not received then optionally, a different frequency of messaging may be displayed with perhaps less urgency may be displayed because it is not clear that the medication was not taken, however depending on the product information 309 the absence of positive conformation that the medication has not been taken is serious and should be investigated.

In one instance, the dispensed signal 306 is generated when the user takes the message whereas the not medicated signal 314 is generated when the dispensed signal is not taken according to the time as determined by the product information 309.

Where a heartbeat 307 and/or dispensing 306 and/or alerts 314 are not received, then devices may attempt to regularly reconnect to receive these events including but not limited to the monitoring modes described in this disclosure.

In addition to the mobile computing device 102 or 311 or 313 monitoring and reminding the user if the correct period of time is exceeded, a remote server 312 may also be configured to send a message to a remote person 311 who can contact the user and see why they have not taken their medicine and that they are ok.

Where medication should be stored in a fridge this can also be measured and reported in case the medicine becomes useless because of going stale. The entity detection device can be fitted with a temperature, light and/or other sensors so that the conditions for medicine storage can also be monitored.

Antibiotics as an example should not be missed and if a dosage is taken at an incorrect time then the time for the next dose should be adjusted. An algorithm in the entity detection device associated with the pill box can adjust the time for the next dose from knowing when the correct time was. Additionally an alert 304 could also be provided if the medicine is not being stored in the correct environment (taking into account temperature and ambient light for example) as configured by product information 309 or has expired, which may be specifically looked up from a QR code on the packaging encoding a unique product or a batch ID.

The application of medicines is not limited to the case where the user administers the medication to themself.

Parents (for example as user 311) have a need to know that medication has been correctly given to their children in a setting where the children do not have access to the medicine to give it to themselves and the parent may not be present, such as schools.

Relatives and carers 311 for patients may also wish to know when a nurse or teacher has given the medicine for peace of mind.

Additionally the teacher or nurse 313 may have identification 318 that is communicated to the device 312, 102, 110 when the medication is given.

The teacher or nurse ID 318 may be sent from their mobile computing device 102 or an entity detection device 110 fitted to them as 317, this allows verification that the person who is giving the medication is authorised. This gives assurance to the patient and family of the of patient.

The device 317 or mobile computing device used to communicate may be protected with a password to ensure other people cannot use the same device or code. There are many cases where care facilities are allowing unqualified staff to give medicine which can cause death or further illness.

These systems also enables a parent to know the medication that the child has had in his absence such as at school or to capture the situation where medication is need to discover patterns that may be leading to health issues.

As one example, in many schools, all medications are administers by staff from one location where a mobile computing device 102 may be scheduled with all medicines and times to administer stored. Each student's medicine box or device such as Inhaler with entity detection attached may be monitored by the device 102.

A staff member 313 can may receive an alert from the mobile computing device 102.

In the case of antibiotics as one example, which need to be taken at regular intervals in a day, a parent would like to know that either the medication has been taken or has not been taken so that they could ring the school. If the mobile computing device detects the application via the entity detection device within a configured time frame then it can send an message to remote user such as a parent. If the staff member does not respond to the mobile computing device 102 then a message can be sent to the parent. A remote server can also be setup to receive a confirmation message when the medication is given and if it does not receive to send a message to the parent as backup in case the mobile computing device can't communicate whether or not the medication has been given.

Additionally, for example, a school child 315 may also wear bracelet that is programmed with the medication times 310 and with to alert the child also if the so they can remind the teacher.

The mobile computing device 102 can also communicate the application event to remote users such as parents or physicians 311 including the log results 308.

Figure 4:
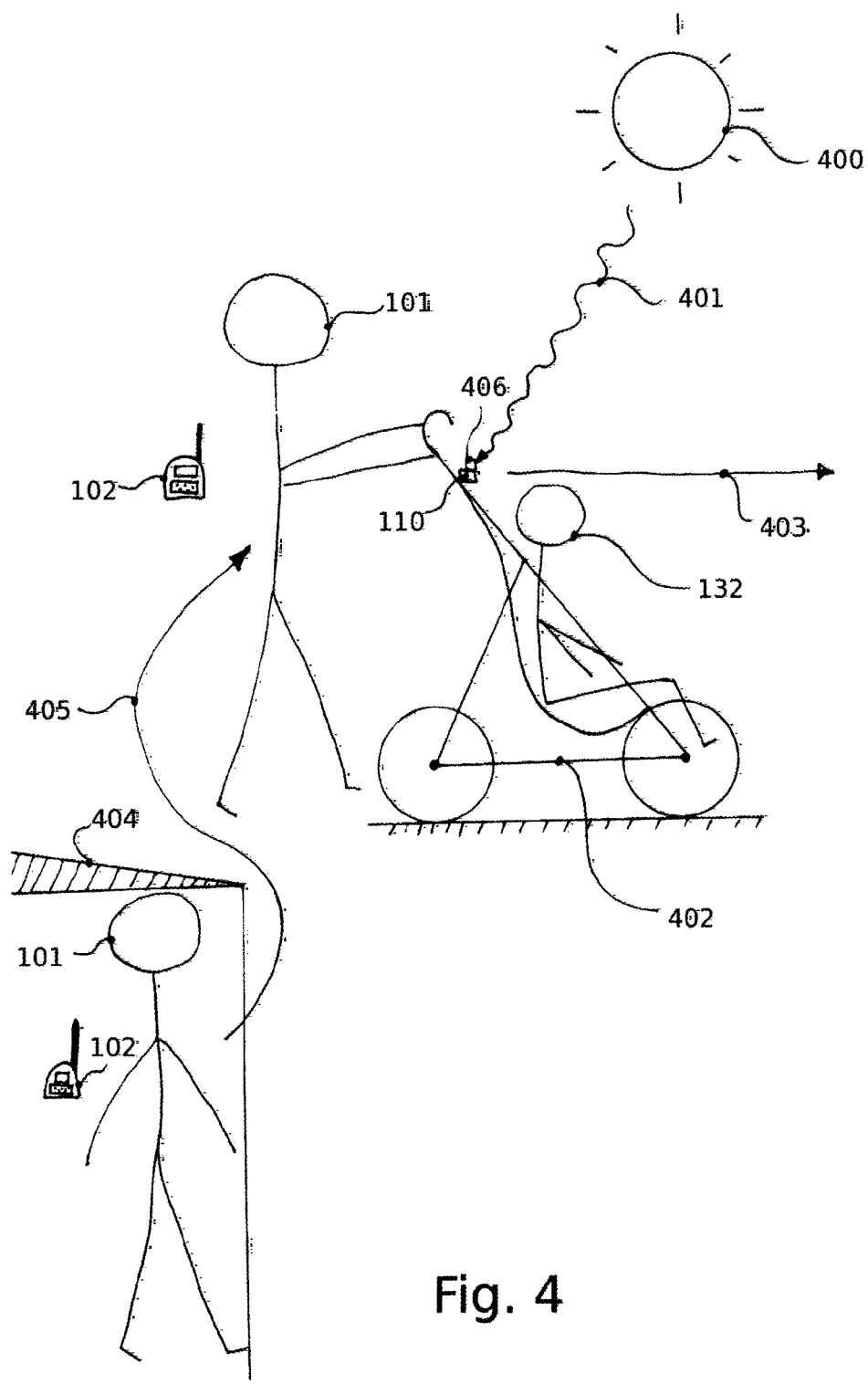
FIG. 4 shows a stroller or pram which has an entity detection device which has connected to it a UV measurement device and contains an accelerometer such that when the user's mobile computing device 102 detects that it is outside and optionally the UV may be strong from external database sources then it checks to see periodically if the entity detection device 110 is sending it a signal to alert the user that it is measuring a consistent UV level. The entity detection device 110 only measures and/or transmits and/or calculates UV levels if it detects movement of the stroller or pram as measured by the accelerometer in the entity detection device 110.

Referring to FIG. 4, battery consumption by an entity detection device 110 and mobile computing device 102 can be optimised for the detection of UV exposure of a child 132 in a stroller or pram 402. When the user 101 such as a parent leaves 405 the house 404 and using previously described methods this is detected such as the acquisition of a GPS signal and if it is also day light hours and the UV values 141 from remote databases 136 indicate there is some level of UV, then it being to performing periodic polling listening for a signal from the entity detection device 110 on the stroller 402. The entity detection device 110 on the pram will only begin to measure UV radiation 401 from the sun 400 using an additional UV sensor 406 attached to the device when the accelerometer 118 detects the stroller is moving 403. It will then send a signal to the mobile computing device 102 when the UV exposure is over a certain value indicating a risk of too much UV exposure. Optionally, the step of check from a remote database that there is some level of UV can be omitted so that simply by detecting the user is outside, the mobile computing device 102 can periodically check for signals from the entity detection device 110.

When the Entity Detection Device 110 detects the bag 299 is opened in any one if a number of ways but not limited to the methods discussed above, it turns on the transmission so that the Mobile Computing Device 102 can see from the fact that the bag 299 attached Entity Detection Device 110 is advertising itself some event has occurred or alternatively the event is known only after the two device pairs and communicate the event. The Mobile Computing Device 102 is configured always, or according to the zone, or at certain times, or always only if a specific item has been taken, or is known to be carried for example from the home that day.

Zones, areas or locations can be defined as geographic locations as well as including trips between locations, and over approximately similar times or lengths of times at different times of day or week. Overtime the Mobile Computing Device 102 can notice trips and also when they come to end by way of final GPS location, the length of trip, acceleration and gyroscope 119 patterns including when the bus stops and it is predicted to be the final destination. Users can also turn on explicitly monitoring when think conditions are higher risk. These higher risk area data can be stored at a remote server for use to determine overall risky areas and share this risk information with other users in a social website manner. The ends of trips and journeys, for example when the user may get off a bus is a risky time for leaving items behind, the time during the time travelling on the train may also have a higher risk of threat of theft.

In these ways GPS and other location determination, acceleration, time and/or location as well as patterns of these associated with journey which may also optionally be a repeated journey, can then be used to learn when to increase the polling frequency or use any of the monitoring modes as well as potentially as described in monitoring mode bonding can be performed especially some time before, or as soon as when for example, the predicted the bus stop from this said this location, movement and trip information indicates or predicts that the person is about to get off bonding or frequency of polling increased so that the distance between the Entity Detection Device 110 and the entity to which it is attached and the Mobile Computing Device 102 and it's user can be monitored to ensure that during these critical high risk moments when the user is getting up the signal strength is strong and the distance indicated is close to ensure that the item is not left behind and additionally that the acceleration is matched An additional heuristic that may also be used in addition to the monitoring using location, time, path information is movement analysis using acceleration and gyroscopic detection of movements corresponding to someone standing up as measure from the Mobile Computing Device 102. This can be used as a trigger to check if the Entity Detection Device 110 is also being moved and optionally in a similar fashion indicating that they are both moving together and so the entity is not being left behind.

Acceleration of the entity which is not equal to the Mobile Computing Device 102 and it's user depending on a journey of location may indicate entity such as bag 299 is moving whereas the user staying still. If this is in an area of hazard like an airport then the monitoring mode should be set to ensure constantly higher frequency monitoring using one of the monitoring modes included bonding or pairing.

In each of this embodiment the Entity Detection Device 110 and Mobile Computing Device 102 can be considered to be communication using but not limited to any of the monitoring modes previously described.

In each of these other embodiments the Entity Detection Device 110 and Mobile Computing Device 102 can be considered to be communication using but not limited to any of the monitoring modes previously described.

Zones, areas or locations can have a fixed mobile computing device contact hub 109 which performs the same function as a mobile computing device, but differing in that when the user and/or the user's mobile computing device is absent the hub 109 can relay a detection of entities leaving or moved or in other ways actuated or triggered to the user's mobile computing device if the user and associated mobile computing device is remote to the zone in this way and allow the fixed hub 109 mobile computing device to take over the monitoring for triggers and information from entity devices. These hubs 109 can be useful for example when the user wishes to leave an object with entity detector to watch an entity and/or area.

A hub 109 could also be used to collect and forward information from entity devices that are constantly in range or come and go from being in range using monitoring modes techniques as described including the entity device listening periodically for hubs 109 and transmitting information when a hub 109 is found and/or enough information has been collected, awaking from sleep mode at set times chosen by the user as likely to be able to transfer stored information and listening for a hub 109 or awaking from sleep and transmitting the presence of the entity device to which the hub 109 replies and then a response is sent by the entity device to the mobile computing device to transfer information. Optionally when the user mobile computing device leaves range the entity device can be configured to search for a hub 109. As described, adaptive discovery of the best place and time for entity device and/or mobile computing device to awake or transmit can be adaptive algorithm, learning from previously success data exchanges and also having the Entity Detection Device 110 awake and listen at set times for a hub 109. Additionally, the adaptive algorithm can take different strategies depending on the urgency of the transfer and data storage remaining for example if little storage room remained then transfer may be urgent or if data transfer is required at least once a week then as come near to the time the Entity Detection Device 110 must transfer turn on with more frequency.

As described for the monitoring modes, a transmission from the Entity Detection Device 110 can be initiated by the Entity Detection Device 110 when the signal strength of the hub 109 is below a certain level which still allows depending on the transmission power of the Entity Detection Device 110 the Entity Detection Device 110 to contact the hub 109 and alert it that the Entity Detection Device 110 is leaving range. In the case of a child 132 leaving a play area wearing on his hand an Entity Detection Device 110, the Entity Detection Device 110 can transmit back to the hub 109 when the child 132 is determined by the signal strength to be a certain distance from the hub 109. The hub 109 which may have internet connection, Bluetooth connection as well as SMS and email may then contact the teacher locally as well as parents remotely. Information on who to contact can be in a database or stored in the device.

In the case of bag 299 or bike 150 with an Entity Detection Device 110 sensing for example acceleration if they are moved even slightly as a precursor to being stolen, then depending if and how much acceleration as per the Entity Detection Device 110 profile, then the hub 109 can be alerted and optionally a camera and/or alarms action or the owner as identified by an ID for the Entity Detection Device 110 can be contacted where details are stored in database. In another example, a hub 109 could monitor a room allowing a bag 299 with Entity Detection Device 110 to be left in hotel room or office and be monitored. In the case of the bag 299 and/or the bike 150 using any of the monitoring modes, if they move out of range of the hub 109 then an alert is triggered. Optionally, movement of the entities under the monitoring of a hub 109, can be ignored if the user's Mobile Computing Device 102 is detected by the hub 109 using any of the monitoring modes to be present including also the Mobile Computing Device 102 periodically transmitting it's Identification.

Presently there is little recourse for a passenger whose bag is illegally opened during travel. In this situation it would be highly desirable to discover who opened their bag. If the bag 299 is opened in the presence of hub 109 and both the entity detection device 110 and the hub 109 can authenticate each other cryptographically or otherwise, for example in the case where the hub 109 is in a secure baggage handling centre, then the entity detection device 110 will cause the attached green indicator 211 to illuminate which is the state after the user closes the bag in the presence of the user's mobile computing device 102 or otherwise indicates to the device 110 that it is in a secure state to be indicated as green. If the bag is later opened in the presence of the authenticated hub 109, then the indicator 211 will change to yellow to indicate to the user and security authorities that the bag has been opened but at a secure hub 109 indicating also the hub's ID and associated staff including mobile computing devices 102 to further allow identification of who opened the bag including time and device 102 proximity information. If the bag is opened without successful authentication with a hub and not in the presence of the user's mobile computing device 102, then the time will be logged and the indicator 211 set to red to warn that the bag has been opened illegally. An alarm 212 may optionally also be configured to be sounded when the user's mobile computing device 102 is not present and/or the bag is in a high risk area. Several alarms 212 may be dispersed at various points on the bag and/or hidden or placed below mesh running over a wide area so that it is difficult to silence the the alarm(s) by covering or damaging them. In all cases, the time duration of the opening of a bag can be logged along with accelerometer movements, allowing a later reviewing of the data if a bag has been damage to ascertain at which point during the trip it was damaged.

TSA locks are routinely used and trusted however the locks can be opened with legitimate or copied keys. In another embodiment, a version of the TSA lock is configured in a similar fashion so that in place of the bag 299 it is the opening of the lock that is monitored in the same fashion. In this way the passenger would have proof the lock was opened and the time it was opened.

Figure 5:
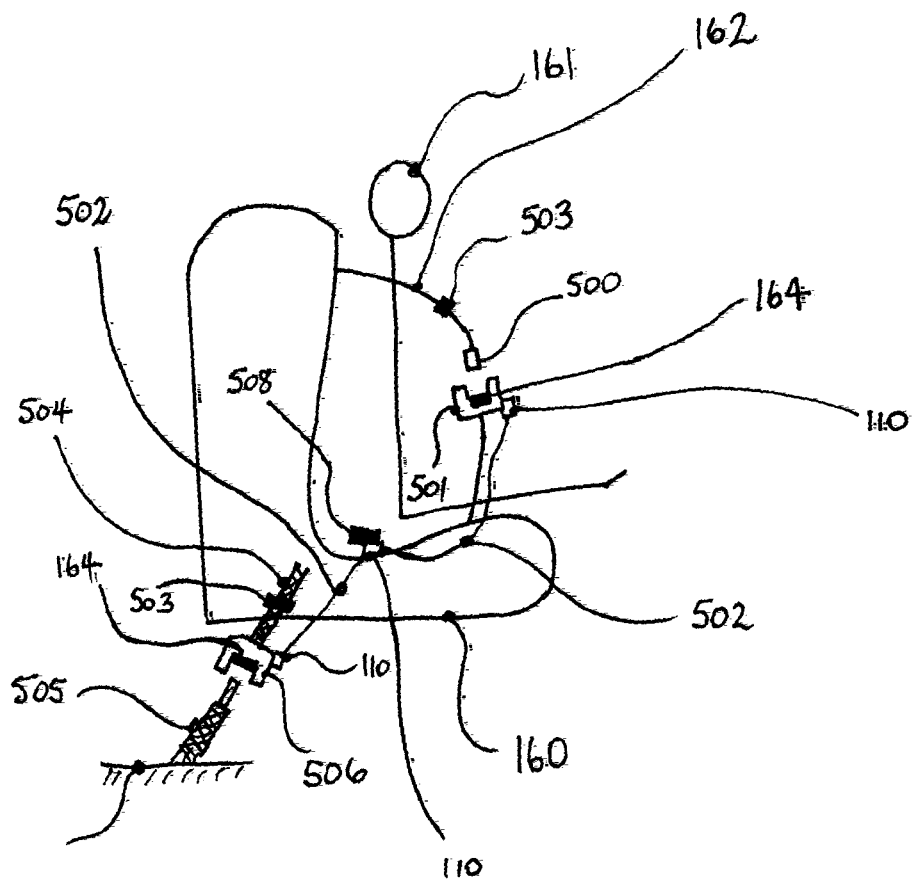
FIG. 5 shows a radio equipped processor and sensor device that provides some aspects of the invention.

Referring to FIGS. 1 and 5, Parents with small children are often very busy and may forget to buckle the seat belt from time to time. While modern cars have mechanisms to detect if someone is sitting in a seat but the buckle is unfastened there is no such mechanism for child seats 160 in cars. In the case of a car seat 160 in a car holding a child 161 safely by a seat belt 162 the child is safe only if the connector or buckle 163 is connected. An entity detection device 110 with a contact switch 164 connected to the buckle can sense if it is connected to the belt 162. Additionally an accelerometer on 110 can also detect the motion corresponding to the act of connection measured by changes in the accelerometer, as well as the orientation of the belt by the varying X, Y and Z orientations on a 3-D accelerometer indicating if the belt is lying unconnected on the seat or connected as indicated by some form of angle and/or orientation when the child is in the seat and the belt is connected in place. If the user such as a parent has their mobile computing device 102 with them, either the entity detection device 110 connected to the buckle 163 or the mobile computing device 102 can detect acceleration consistent with car movements and if there was no connection of the buckle as sensed by no accelerometer measurements corresponding to connection or the correct position of the connector or switch contact or pressure measured on the strap by a pressures sensor as some examples, the entity detection device 110 can send an alert to the mobile computing device 102 which is listening and especially when it also detects acceleration consistent with a car moving. The mobile computing device 102 can also detect acceleration of the car and send a signal to the device 110 to find out if the belt is connected and if not connected, then send an alert to the user via the mobile computing device 102. As still another option, the entity detection device 110 can detect the acceleration and generate an alert such as an audio alert when the car movement is detected.

Referring to FIG. 5, in one of many possible configurations a belt buckle 164 consists of two halves, some form of female socket 501 and male section 500 that mates and locks the belt together with a switch 164 to detect the joining of the belt 162. The entity detection device 110 can be connected to measure by accelerometer position and movement which indicate connection of the belt.

Pressure sensors 503 can measure the belt tension to detect if the belts 506, 162 are connected. Sensors are connected by wires 502 which are connected back to the entity detection device 110. In the case of the contact switch 164, the switch can close a circuit for wire 502 when pressure is placed on the switch.

Many car seat designs also require a belt 504 to pass through the back of the car seat be connected by a buckle 506 to the car by a second belt 505. This buckle 506 can also be instrumented in a similar fashion to 163. If the belt buckle 506 is not closed then the car seat will be dangerous.

A detector 508 is provided in order to detect if someone is sitting in the car seat. Detector 508 may sense movement of the belt's connector or it may sense that the position of the connector is not correct by use of accelerometer readings. Alternatively detector 508 may take the form of a contact switch or pressure transducer positioned to experience pressure when the child 161 sits on the seat. Further alternatives include optical or thermal sensors, as some non limiting ways to detect the presence of a child in the seat. When a child is detected to be sitting on the seat and belts are not buckled then a detection should be made, in another alternative the belts should alarm whenever they are not plugged-in regardless of the presence of a child 161.

In another embodiment, the entity detection device 110 checks if the contact switch 164 is closed as requested by mobile computing device 102 when 102 detects acceleration consistent with car movement.

In another embodiment, the belts in a pram or stroller could also use the same system described above to ensure the safety of a child by ensuring all belts are in place when the pram moves.

A Profile can be set for the Entity Detection Device 110 depending on the entity it is attached to and user preferences defining for any entity how much and what activities will trigger for example certain accelerations and/or bag 299 opening alerts. For example, minor movement acceleration of a bicycle lock or lock on a tent can be ignored but if they are consistent over a certain time, or indicates tampering then an alarm may be triggered.

Hubs 109 include, can be located at the bike 150 racks or cages, hotels and hostels, in kindergarten, play parks, and apartment buildings to monitor. Optionally a Camera communicating by Bluetooth could be used also and security guard via server.

Initially, a bag 135 (299) may be monitored by a mobile computing device 102 by radio connections 124 according to monitoring modes. However the user 101 can leave 129 the bag 135 in the area 120 within radio range of 109 so that the hub 109 (fixed mobile computing device 102) can take over monitoring the bag and hub 109 which is monitoring the bag can alert 128 the user 101 when remote from the area 120 via the user's mobile computing device 102.

As one example a person could leave a bag 299 or laptop with an attached Entity Detection Device 110 in their room and know that the hotel, hostel, office, hub 109 will tell them according to the type of configuration for the entity such as if the item is moved at all, or over a certain amount, in a pattern according to gyroscope 119 is being moved, as well as if it is opened or goes out of range as shown by the path 125, of the hub 109 and it's area 120 for that room or area of the hotel, or moves as determined by triangulation then the Entity Detection Device 110 could send message to the hotel security staff by contact the hub 109 which is connected to local WiFi or internet. The hub 109 could also contact the user who is remote to the location via internet, SMS, email or other communication methods.

As well as fixed hubs 109, a Mobile Computing Device 102 could be a cheap Bluetooth device placed in your car to monitor for example an entity detection device 110 attached to tools or equipment or sports equipment such as a surfboard 152 on top of a car 151. When the Entity Detection Device 110 detects movement this communicated to the Mobile Computing Device 102 which then contacts the user via internet, SMS, email or other communication methods. Alternatively, if there is no hub 109 in a hotel room again a cheap bluetooth enabled Mobile Computing Device 102 could be placed in the bag 299 and either its own acceleration and/or that of the Entity Detection Device 110 can be used to alert the remote user.

In another embodiment a hub 109 or multiplicity of hubs 109 could be used to protect a child by alerting one or more interested parties such as parent far away, teacher nearby and also the child when the child exceeds or reaches the edge of a perimeter as measured by a reduction in signal strength which is can be considered to have exceeded or be approaching the edge of a perimeter where various known algorithms may be applied to ensure an accurate reading including methods not limited to but including averaging and excluding anomalous values.

The system may use some of the monitoring modes previously discussed including, using a timer to allow the entity device to sleep times of days and optionally days of the week when the device may not be needed, only turning on at other times and listening, and again with an adaptive listening receiving cycle which is of low frequency of less likely times for the entity or child and entity device to enter a hub 109 area. Additionally acceleration of the device can be used to trigger the increase polling at any stage. Additionally, the polling time can be kept at a low frequency until initial acquisition of the entry in the hub 109 as the likelihood of leaving before the device can notice the increased polling rate that would occur after entry is smaller. In these ways the battery life can be extended at times before a entity needs to use ore power to monitor.

In addition the system employs a method to auto mate the turning on and off of the device so that again the battery life can be preserved.

Once the entity device moves in range a hub 109 or multiplicity of hubs 109, it assume a higher polling rate that is proportional to increasing distance (closeness to perimeter) from the hub 109 and the risk of the area where the zone is located and the amount of movement.

Triangulation can also be employed when the entity is estimated to be near the edge of a perimeter and require accurate monitoring including detection of movements in paths leaving the area.

Additional hubs 154 can be placed with overlapping areas to the main hub 109 covering the area 120, for example near exits or places through which a child may leave. If additional hub areas 154 are present and they are indicated to the entity device as extra exit markers by a identifier then if the Entity Detection Device 110 detects them as can still detect the main hub 109 then it may bond or frequently poll to check if the distance from the Entity Detection Device 110 to the hub 109 is decreasing while still in the presence of the extra hub 109. If this continues and especially if both the distance from the main and extra hub 109 increase then an alert is generated indicating that the Entity Detection Device 110 is leaving the hub 109 area as shown by the path 157.

The extra hub 109 can be used to protect the circumstance for example when there is a door so that an alert is generated if using any of the monitoring modes the extra hub 109 is detected at a certain signal strength and hence distance.

If an Entity Detection Device 110 detects that the user's Mobile Computing Device 102 is leaving an area but there is a hub 109 that can take over monitoring and the Entity Detection Device 110 has been configured to allow this then the hub 109 will then take over monitoring and pass alerts and data to the user who is now remote as well as optionally additionally local users who can monitor. If a child, or entity such bag 299 with attached Entity Detection Device 110 leaves an area however the user (or a group of users) and attached Mobile Computing Device 102 are also within a certain range then an alert may not be generated as the person or entity is considered to be able to protect the person or entity and also know and be supervising the persons departure from a monitored hub 109. Alternatively, the user via the Mobile Computing Device 102 may receive an alert to confirm that they know that the child or object is leaving the area and optionally that monitoring is to be turned off. One or more remote users may also receive a message to let them know that the Entity Detection Device 110 is leaving a hub 109 with a user and attached Mobile Computing Device 102.

In addition to the monitoring of children, the system may also be used to monitoring the sick or elderly.

The hub 109 and extra can also communicate information and match up data.

In one embodiment, one or more hubs 109 can be placed permanently or temporarily and used to collect information as "hub information collectors" by monitoring entity device either as events happen and are sent immediately if the hub 109 is present onto a server for activities including not limited to logging or alert a third party including when the are not there. As the entity device does not have the ability to connect to WiFi, internet or other such as network connections it can use the hub 109 as the means to achieve this in a energy efficient manner connecting to the hub 109 when it is present using a variety of connection techniques involving techniques such as the entity polling the listening for a transmitting hub 109 with maximum sleep for the entity and listening for a hub 109 transmitting only when only necessary including also accumulating results where possible to limit the frequency of connection as disclosed in this invention description including but not limited to the description for "monitoring mode strategies"

In one method, the entity device turns on discoverable advertising when it has data to transmit. The user suggests a time or the phone learns the time it can contact the hub 109 and when the data transfer is over the Entity Detection Device 110 sleeps between transfers.

Parents spend a lot of money on musical tuition. Progress with and instrument is tightly tied to the frequency, length of time and spacing of practising. A method is desired to a track and reward students for consistent practising as well as alert them and parents and teacher when this is not happening. As one example, musical instrument cases, stands or the instruments themselves have contact switch, accelerometer 118, tilt switches or pressure sensors attached that trigger when the case is opened, or an instrument lift off a stand, for example, the removal and replacement of a flute on a flute stand. In the case of a flute stand where the flute is slid vertically over a cylinder that holds it upright as will be well known to the reader, the base of the stand in contact with the flute could have a contact, pressure switch trigger by the weight of the flute, or an optical sensor as some examples to sense when the flute is paced on the base. The Entity Detection Device 110 can be in sleep state but woken up when the said switch mechanism is operated as one example. In this manner, the time the flute is off the stand as well as the frequency and time can be logged and recorded. Additionally to verify that the flute is played, noise sample using a microphone attached also to the Entity Detection Device 110 which could also perform analysis to detect frequency characteristics of the musical instrument. This description is for a flute but the same principle could be applied to other musical instruments. As an alternative mechanism an entity detection device 110 containing an accelerometer 118 could be placed on the flute to sense movement.

The accelerometer patterns detected by the accelerometer 118 or other sensors that constitute the action of playing the flute as opposed to just picking it up for a while can be stored in the entity profile 137 as a sensor detection pattern 196 as well as being stored in the sensor pattern database 195.

Sensor detection patterns 196 can be configured for a variety of sensors that can be connected to entity detection device 110. The patterns can be configured by but not limited to, entering data sequences, values and ranges of data, or with the sensor(s) attached to the entity detection device (s) the user can move or in other ways actuate the sensors or environment so the sensor is sensing in a record mode which can be started, paused and stopped. The sensor detection patterns 196 can be uploaded to the entity detection device 110 and/or mobile computing device and backend server to perform the processing. Individual data values in the sensor detection pattern can be termed sensor values.

Different sensor data can be recorded for different detections. For example accelerometer data can be used to detect when someone was walking and stopped, picked up a flute, picked up and inverted a container for example while feeding fish, or opened a door etc.

The Sensor detection patterns 196 may also have an icon, title and description associated with them and may be reusable for a user and shareable to other users.

To make a positive detection of a sensor detection pattern 196, sensor data must be matched against the pattern 196. To achieve this in known art there is a variety of well established principles including correlation, as well as techniques to clean data and allow for variance. The placement of the sensor on specific devices or measurement at specific times when activities should occur add context that makes detection simpler when beginning from a known context.

Sensor detection patterns 196 and outputs can be combined into sensor programs 197 expressed as programmatic constructs such as "IF THEN ELSE" statements or graphical combinations of sensors and actions to perform actions. The outputs can be displays or alerts on a entity detection device 110 and/or mobile computing device 102 being visual or audio. For example, in the case of the flute, on detection of a sensor detection pattern 196 defined as movement with the flute mostly in the horizontal position but moving for approximately 20 minutes a "flute sensor detection pattern" is detected. A sensor program 197, defines that when the "flute sensor detection pattern" is triggered, points 1002 are sent to a server 1001. The sensor program 197 defined by the user may have sections of software running on the entity detection device 110 such as the detection of the flute playing pattern, sections of the program on the mobile computing device 102 or hub 109 that check for completed "flute patterns" and upload them as points 1002 to 1001 as one non limiting example. As described various "monitoring modes" as described can be combined to deal with the distribution of the sensor program 197 detections and outputs spread over a set of hardware from entity detection devices 110, mobile computing devices 102, 109 and back-end servers 1001.

The information collected could be used to give or reduce rewards, points or scores, sharing progress data with the teacher, unlock levels or new characters or "power ups" in games, or contribute to points towards a purchase physical of real goods and services on an online store, allow the use of resources such as computers, game consoles, tablets, TV or be converted into money or time access to devices or services. For example, if an adult earns rewards, points or scores these may translate into time using a gym or a holiday, bonus pay or time off work. Games could use themes that reinforce the activity being trained for example, a musical theme for the could be used in the game. In addition to flutes, guitars, pianos (measuring the vibration when played) and all kinds of musical instruments can be monitored each with different accelerometer or sound signatures to be detected to indicated when played either by movement of the instrument while playing or sound coming from the instrument. The entity detection device 110 may be in sleep mode and woken up when acceleration is recorded which is then logged along with duration and time which may be directly communicated with a mobile computing device 102 and onto a remote server 1001 or logged and stored on the entity detection device 110 and at a later time transferred to the mobile computing device 102.

In one embodiment, a system is provided where users may combine a variety of inputs expressed as sensor patterns 196 and outputs into a sensor programs 197 expressed as programmatic constructs such as "IF THEN ELSE" statements or graphical combinations of sensors and actions to perform actions.

Figure 11:
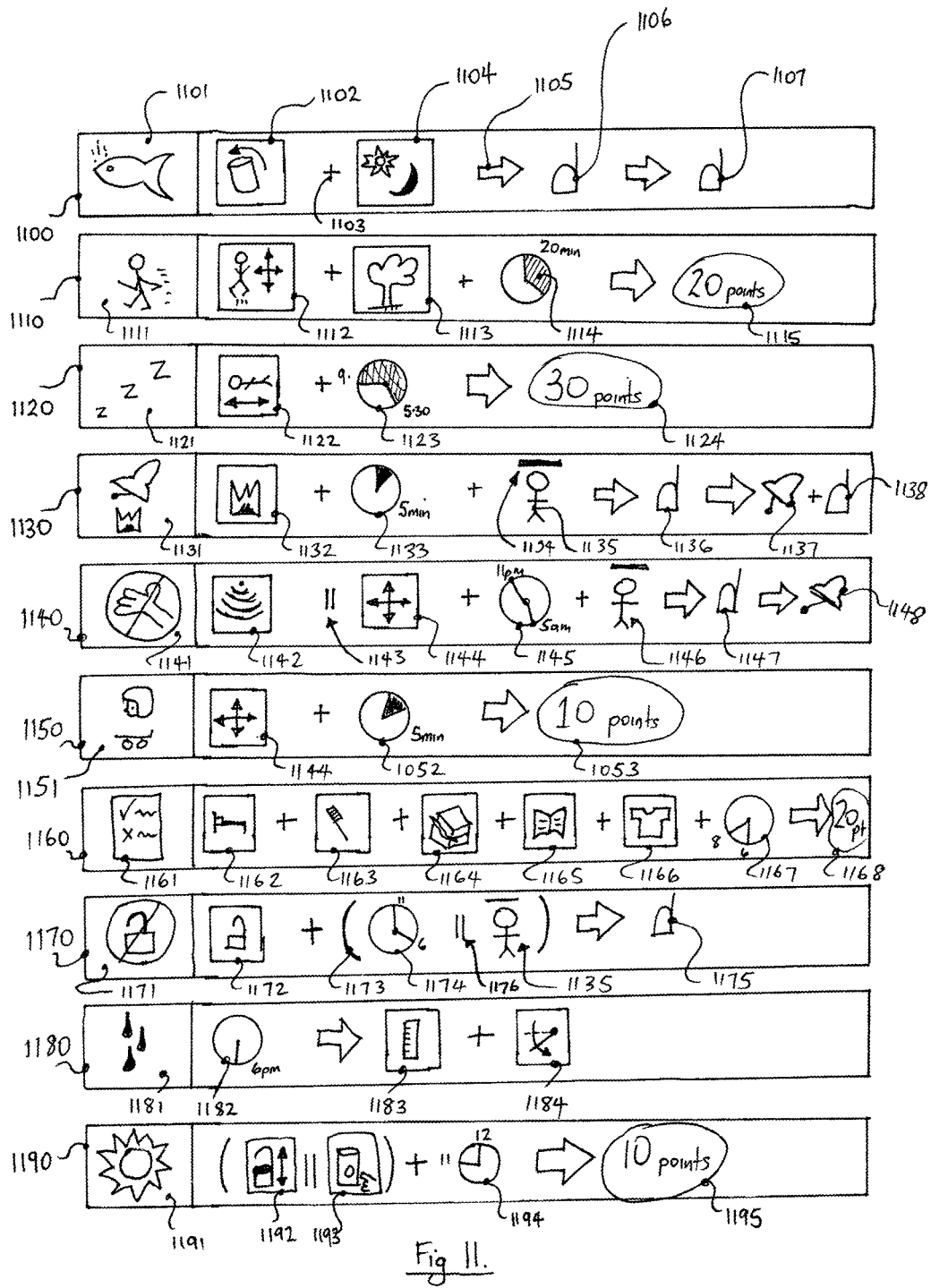
FIG. 11 shows a system to allow users to create sensor programs and record patterns for sensor detection to allow customisation to customers unique needs which can also be shared with others.

Referring to FIG. 11, ten example graphical sensor programs are shown. A sensor program 107 to remind someone to feed fish is shown in 1100 which can also be shared for download and use by other users into their own entity detection device 110 and mobile computing device 102. The icon 1100 may be used to communicate to other users what the purpose of the program is and it may be accompanied by a title and description not shown in the figure. The program reads left to right. A sensor detection pattern 196 has been recorded and used in 1102 to detect the shaking of the device 102 with accelerometer 118 mounted on a fish feed container in a pattern that would correspond to the pattern of shaking of a tin (in this case fish feed). The plus sign 1103 represents the addition of the second condition in 1104 that must happen every day otherwise the arrow symbol 1105 indicates the action to take when this does not happen is to contact the user 1106 (who is in charge of feeding) via their device 102 and if there is no response contact the owner 1107 through their device 102.

A second sensor program 1110 rewards children who are active in the garden for 20 mins with 20 points towards a physical or virtual reward. The Icon 1111 represents activity while the sensor detection pattern 1112 detect general physical activity from an entity detection device 110 on the child such as on a shoe or wrist band which occurs 1113 outside as specified by another sensor pattern which is a proximity detection to a bluetooth transmitter beacon placed in the garden and this activity occurs for 20 mins 1114 then 20 points 1115 is awarded stored on the mobile computing device 102 and/or score server 1001 as points 1002.

A third sensor program 1120, for rewarding children for sleeping (icon) 1121, uses a sensor pattern 1122 which detects minimal activity corresponding to sleep which occurs for the whole time between 9 pm and 6 am 1123 will award 30 points on the mobile computing device 102 and/or score server 1001 as points 1002. A child would be fitted with a bracelet, pillow, or soft toy mounted entity detection device 110.

A fourth sensor program 1130, warns if the stove is left on when no one is present for more than 5 mins (as this is dangerous) represented by the icon 1130. A sensor detection pattern for temperature or infrared detection of a flame 1132 indicates that when this is detected and it occurs for more than 5 minutes 1133 and the user is not present (represented by the symbol 1134) and detected by the proximity of an entity detection device 110 mounted near the stove and connected to an infrared sensor and the user's mobile computing device 102 being more that 10 m distant. Consequently 1135 the user's mobile computing device 102 is first contacted 1136 and if there is no response then an alarm is raised 1137 and transmitted 1138 to at least one device 102.

When the user was present and the stove was detected as turned on by the PIR reading then via the mobile computing device 102 a message is sent through to the server at this initial time and the server also executes the sensor program specified 5 min timer at the backend. This means that after 5 mins if the the mobile computing device 102 cannot determine from the entity detection device 110 if the PIR is still reading the stove is on not only will the entity detection device sound an alarm (if one is configured) but also the mobile computing device can alert the user that it has been 5 mins that the Stove may have been on with no ability to confirm whether it has now been turned off, but additionally the server will also know after 5 mins if it has not either received a signal from the PIR detecting that the stove is off, or the person is still there and it is still on, or the person is not there but has acknowledged that risk when he was alerted on his mobile computing device 102 in which case it may also send a message such as an SMS or push message to the mobile computing device 102 and/or a message to one or more other third parties. This is particularly helpful in the case of Alzheimer's patients.

A fifth sensor program 1140, protects against theft (icon 1141). When a passive infrared detector sensor detection pattern for general movement is detected 1142 mounted near a bike connected to an entity detection device 110 or the bike with an entity detection device 110 with accelerometer is moved 1144 and the time is between 11 pm and 5 am 1145 and the user is not present 1146 as detectable by the entity detection devices 110 from the user's mobile computing device 102 and the user does not respond 1147 then an alarm connected to one of the entity detection devices sounds 1148.

A sixth sensor program 1150, rewards children for the wearing of a helmet such as for a bike or skateboard (icon 1151). When an entity detection device 110 with accelerometer 118 mounted in a kids safety helmet is moved 1144 for 5 minutes 1052, then 10 points are awarded 1053 on the mobile computing device 102 and/or score server 1001 as points 1002.

Figure 12:
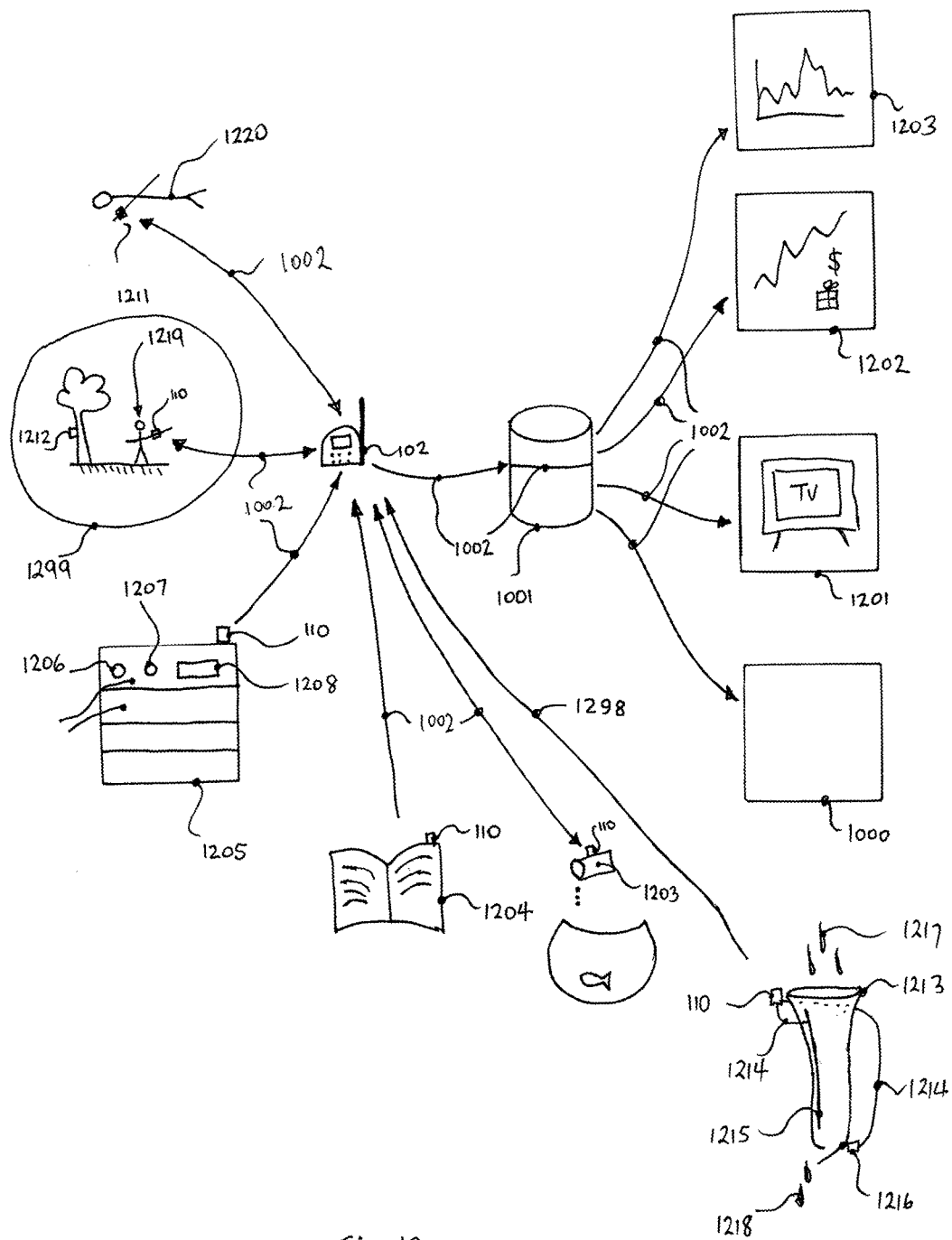
FIG. 12 shows the flexibility of a system to allow a configured sensor program to win prizes, unlock game usage, show results or win physical rewards as a few non limiting examples.

With reference to FIGS. 11 and 12:

A seventh sensor program 1160, consists of a configurable "to do list" or "rewards chart" 1161 where the parent can write on a label 1208 tasks and configure on the mobile computing the frequency with which they should be repeated from a calendar as well as points to be awarded and time of day they should be done. These details would also be explained to the child and optionally included on the label. When the child completes a task she presses a button 1206. The indicator 1207 is initially off, green when done in time, moving to yellow when little time is left to complete a task to red when there is no time left.

In the case of 1160, if the child makes her bed (indicated by pressing the 1st button on the chart with the symbol 1162), cleans her teeth (indicated by pressing the 2nd button on the chart with the symbol 1163), makes her lunch (indicated by pressing the 3rd button on the chart with the symbol 1164), packs homework (indicated by pressing the 4th button on the chart with the symbol 1165), gets dressed (indicated by pressing the 5th button on the chart with the symbol 1166), all by 8 am each day then 20 points are awarded per day on the mobile computing device 102 and/or score server 1001 as points 1002.

The eighth sensor program 1170 reminds a user if they leave a door or window open and leave the house or it is late at night and they are around but may have gone to sleep without closing the window (icon 1171). In one embodiment, a window uses a typical security detection apparatus such as a magnet on one side and a reed switch on the other. The reed switch is connected to the entity detection device 110 to enable sensing of the position of the window. When the window is detected to be open 1172 (as detected by an open circuit reed switch because the magnet is not in range) and it is between 11 pm and 6 am 1174 or 1176 the user is not present 1135 (perhaps having left the house) then the mobile computing device of the user will be alerted 1175. In the case where the person is not present they will be alerted if as they left the entity detection device 110 was checked and was found to be open, or the last known state was unchecked or opened. The brackets 1173 mean that the operations inside are grouped together, as is normal practice in computer programming.

An alternative system may involve use of an accelerometer to detect movement and infer that from a starting position whether a window or door is open or closed or locked or unlocked.

A ninth sensor program 1180 takes a rain gauge 1213 measurement 1183 at 6 pm 1182 each day and then output a signal activating a solenoid 1216 that empties the gauge for the next day 1184. The rain icon 1181 represents the rain gauge sensor program.

A tenth sensor program, 1190, deals with rewards for sunscreen application as custom specified by a parent user. When the larger sunscreen bottle is moved or pumped 1192 or the small size bottle is used 1193 as indicated by the child pressing the button on it and it is 1194 between 11 and 12 pm (so before lunch but not too early for reapplication), then 20 points 1195 are awarded each day on the mobile computing device 102 and/or score server 1001 as points 1002. The icon 1191 represents this program.

In these examples it is assumed that either immediately or after the event the entity detection device 110 can pair with the mobile computing device to transmit data.

The five graphical program constructs discussed could alternatively also be constructed using "if, then, else" statements where conditions can be combined with boolean operators as one example and more than one action. For example, in the case of the graphical construct, 1100 to specify what to do if the fish is not fed regularly, then the same program may be described by the expression "IF NOT(shake acceleration) AND TIME>2 DAYS THEN REMIND Feeder AND Remote Owner" as one such example of how the construct could be written.

With further reference to FIG. 1:

The sensor programs 197 are stored as in a sensor program database 193 that can be shared between users. Each Sensor program has an associated Title, Icon and Description. The sensor programs 196 can be uploaded to an entity detection device 110 and/or mobile computing device and/or backend server to perform the processing.

Referring to FIGS. 11 and 12:—

When programs are successfully completed they transmit points 1002 via a mobile computing device 102 to a score server 1001 for storage and subsequent retrieval. Usage of devices such as tablets 1000, TVs 1201 and virtual or physical shops 1202 and graphing visualisation 1203 can be accessed by redeeming earnt points 1002.

The feeding of fish each day determined by measurement of a fish food container 1203 with attached device 110 with included accelerometer 118 will generate points 1002 stored in the score server 1001.

The reading of a book such as the Bible 1204 with device 110 including accelerometer 118 as determined by movement by a child each day will earn points 1002 stored in the score server 1001 as 1002.

A "task completed" chart 1205 is fitted with a series of multiple horizontal rows each consisting of a contact switch 1206, an indicator 1207 which is initially off, green when done in time, moving to yellow when little time is left to complete a task to red when there is no time left and resets at some period such as each day (or depending on the period of the task), and also a label 1208 which can be added by the user for example "made bed". Only one row is shown in FIG. 12.

A Sensor Program could be created to award points 1002 for each contact switch 1206 activation (corresponding to a task completion), optionally if also done on time as specified by the program. In this manner, children are incentivized to complete tasks as they will receive a physical reward, TV or console time.

The playing of a child 1219 fitted with a bracelet attached to entity detection device 110 in proximity to a "outside" position bluetooth beacon 1212 with transmission area as shown by 1299 can earn the child points 1002 stored in the score server 1001 as 1002. This encourages kids to be active and incentivizes kids to do physical play to get virtual play time.

A child 1220 trying to sleep fitted with bracelet 1211 with attached entity detection device 110 who goes to sleep on time as specified by a sensor program 197, can also earn points 1002 stored in the score server 1001 as 1002.

A rain gauge 1213 takes a measurement of the rain 1217 that has collected for a period of time using a capacitive or resistive moisture measurement sensor 1215 connected by wire 1214. At an assigned time the entity detection device 110 outputs a signal activating a solenoid 1216 that empties the gauges of rain 1218 for the next day or time period and sends 1298 the measured rain level to 102.

These points 1002 can be used as an incentive for children or adults because they allow access to tablets 1000 or watching TV 1201, as well as winning physical prizes 1202 or viewing of graphs 1203 of points earned or compliance. The graphs 1203 allow users to track performance and provide motivation for better performance in the future.

The scanning of a QR code by a mobile computing device 102 may also redeem or earn points for a selected user. As some non limiting examples, the checking of a garden area for snails, or watering a garden by a child may have a QR code outside which they have to scan when they start and end the activity or when the sections of a book are completed a QR code can be scanned to earn points. Parents can also hand out QR codes including with scratch away covers as rewards to redeem points 1002. A parent may also use the mobile computing device 102 to assign or deduct points 1002 stored in the score server 1001 as 1002.

Depending on the measurement required, input sensors 190 measuring physical properties, including, but not limited to pressure, magnetism, water content, movement may be connected to 117. All possible types of output 191 may be connected to 117.

The kinds of sensing that can be performed includes, but is not limited to,

Light, UV, Infra red, contact switches, pressure, magnetic field, accelerometers, Gyroscope, voltage, current, resistances, sound, gases, vibration, temperature, as well as proximity measured between bluetooth devices, as well as presence and absence of users depending on whether their Bluetooth Low Energy enabled device fitted with an ID is detected in proximity as well as time, date, frequency. Location can also be determined by detecting Bluetooth Low Energy beacons and/or GPS location from a 102. Inputs and output can be to and from the internet. Outputs can also be a notification to a device, a siren, audio alarm or display on a mobile computing device.

By qualifying symbols and ID for with a device ID to indicate which devices to run the element of code on, multiple device 110, 102 and 1001 can be combined to create a detection symbol.

In some embodiments, given an entity detection device 110 to which various sensors 190 and outputs 191 can be attached, and having software (either alone or in a combination of devices 110 and 102), a range of customized sensor programs 197 can be created by users, shared with other users or configured into a commercial product shipped with the program.

Habits can be created by monitoring, reporting and rewarding actions and consistent behaviours. Having a way to check that an activity has been completed when the user has instructed an agent to perform the activity on his behalf provides peace of mind.

In one embodiment, the user may wish to know (whether in real time or at a later date) when a hose, watering can or mister has been used to water plants and have a mechanism to allocate rewards to motivate compliance or activity. This may be done to either remind the user or an agent performing the action on the user's behalf, including for example, a child who has been asked by a parent to remember to perform a task or alternatively a employer and employee. An entity detection device 110 fitted with an accelerometer 118 and/or contact, tilt or vibration switch connected to the hose, watering can or mister, or other sensors such as a flow meter measuring the water output as some non limiting examples of ways to determine the watering has been done, including also having the user press a switch on the device 110 to indicate completion, can be used to log the time and duration of usages and optionally according to the sensor program 197, report scores, rewards including money and/or points 1002 and this logged information to a mobile computing device 102 of the user and/or agent or to a hub 109 and then logged or communicated to a remote user's mobile computing device 102 at the point when detected or when the entity detection device 110 and mobile computing devices 102, 109 can exchange data. The data is then stored as reward, points, scores, money, progress 1002 and/or log records in the database 1001.

In one embodiment, the user may wish to know (whether in real time or at a later date) when pets are fed, including for example, when the user is away and wants some assurance that agent has completed the task, or to remind a user or agent for example, by tracking when a fish has been fed and/or the water changed, or a cat or dog bowl refilled or moved while eating and have a mechanism to allocate rewards to motivate compliance or activity. This may be done to either remind the user or an agent performing the action on the user's behalf, including for example, a child who has been asked by a parent to remember to perform a task or alternatively a employer and employee. An entity detection device 110 fitted with an accelerometer 118 and/or contact, tilt or vibration switch is connected to the feeding containers (such as the fish food container) or bowls, or other sensors such as a flow meter as some non limiting examples of ways to determine pets have been fed, including also having the user press a switch on the device 110 to indicate completion, can be used to log the time and duration of usages and optionally according to the sensor program 197, report scores, rewards including money and/or points 1002 and this logged information to a mobile computing device 102 of the user and/or agent or to a hub 109 and then logged or communicated to a remote user's mobile computing device 102 at the point when detected or when the entity detection device 110 and mobile computing devices 102, 109 can exchange data. The data is then stored as reward, points, scores, money, progress 1002 and/or log records in the database 1001.

In one embodiment, the user may wish to know (whether in real time or at a later date) when a child wears clothing, for example, at school, when it is cold such as a coat or hot such as a hat and have a mechanism to allocate rewards to motivate compliance or activity. This may be done to either remind the user or an agent performing the action on the user's behalf, including for example, a child who has been asked by a parent to remember to perform a task or alternatively a employer and employee. An entity detection device 110 fitted with an accelerometer 118 and/or contact, tilt or vibration switch is connected to the clothing as some non limiting examples of ways to determine the clothes have been worn, including also having the user press a switch on the device 110 to indicate wearing, additionally to instrument whether a zipper is done up, in a similar manner to the mechanism for the zipper 204 in FIG. 2, can be used to log the time and duration of usages and optionally according to the sensor program 197, report scores, rewards including money and/or points and this logged information 1002 to a mobile computing device 102 of the user and/or agent or to a hub 109 and then logged or communicated to a remote user's mobile computing device 102 at the point when detected or when the entity detection device 110 and mobile computing devices 102, 109 can exchange data. The data is then stored as reward, points, scores, money, progress 1002 and/or log records in the database 1001.

In one embodiment, the user may wish to know (whether in real time or at a later date) when good habits are being practised and reward them and have a mechanism to allocate rewards to motivate compliance or activity. This may be done to either remind the user or an agent performing the action on the user's behalf, including for example, a child who has been asked by a parent to remember to perform a task or alternatively a employer and employee. An entity detection device 110 fitted with an accelerometer 118 which is connected to the wrist, for example as a wrist band, can be used with a sensor detection pattern 196 to detect accelerometer movements. For child sufferers of cerebral palsy and stroke victims it is important to develop skills with everyday activities (self-care) such as tying shoes, using a knife and fork, brushing hair and teeth and getting dressed. Sensor detection patterns 196 can be created for different activities when the activity is determined to have been done or when the activity being done is specified and the compliance of the activity is measured then points can be awarded. For children who need to practice writing or do home work an entity detection device 110 connected to a pen with an associated sensor detection pattern 196 to reward a child when they use the pen in a manner representative of writing as detected by the sensor detection pattern 196. The acceleration on wrist can be used to log the time and duration of usages and optionally according to the sensor program 197, report scores, rewards including money and/or points and this logged information 1002 to a mobile computing device 102 of the user and/or agent or to a hub 109 and then logged or communicated to a remote user's mobile computing device 102 at the point when detected or when the entity detection device 110 and mobile computing devices 102, 109 can exchange data. The data is then stored as reward, points, scores, money, progress and/or log records in the database 1001.

In a similar manner an entity detection device 110 fitted with an accelerometer 118 which is connected to the wrist can be used to sense activities according to a sensor detection patterns 196. As one example, the use of a water can, playful activity outside by a child, washing hands as some non limiting examples.

In one embodiment, the user may wish to use (whether in real time or at a later date) environmental changes as a method to monitor for events. This may be done to alert the user of circumstances needing attention. An entity detection device 110 fitted with one or more temperature sensors could be used to measure that a garden composter is in the optimum temperature range at one or more points in the heap where the temperature may need to be different for different positions and Sensor detection patterns 196 and sensor programs 197 can be defined using temperature values and '>', '=' and '<' operators in the program to set levels at which a user is alerted.

These various sensors with associated sensor detection patterns 196 can be used to log the time and duration of usages and optionally according to the sensor program 197, report scores, rewards including money and/or points and this logged information 1002 to a mobile computing device 102 of the user and/or agent or to a hub 109 and then logged or communicated to a remote user's mobile computing device 102 at the point when detected or when the entity detection device 110 and mobile computing devices 102, 109 can exchange data. The data is then stored as reward, points, scores, money, progress 1002 and/or log records in the database 1001.

In addition to these examples, by creating sensor programs 197 and configuring any desired appropriate sensor and defining or using The Sensor detection patterns 196 and combined then extendable system. The sensor program 197 may also take an input from a remote server or external input defined to receive a number or boolean value for use by the sensor program 197 being returned by a url or a data type transmitted to the same or different remote server.

The sensor detection patterns 196 can be uploaded to the entity detection device 110 and/or mobile computing device and backend server to perform the processing by software on these devices.

In some embodiments, the sensor program 197 sensors can be distributed across a network of multiple devices 110, 102, 1001 defined by one or more programs where the sensor program's 197 elements including but not limited to the sensors can be qualified by a device number to indicate which device 110 or 102 they are attached to.

Many people need to take medication each day. It is important that medication be taken at the correct intervals and regularly. Missing doses can cause the effect to be reduced and trying to make up doses can be dangerous. Busy people including the elderly, forgetful, or borderline dementia can easy to miss to take their medication. A pill box helps people remember by setting out the compartments in days, and time of days it is designed with individual compartments for different times of the day such as breakfast, lunch, dinner, night and days of the week.

In another embodiment of a "hub information collector", a "pill box" such as a Webster pill box or similar is instrumented with contact switches to measure whether each compartment has been accessed and at what time, a series of pill box sections (such as seven sections corresponding to the days of the week) are instrumented with one common measurement such as a contact switch.

The measurement method for each compartments or series of compartments may be a contact switch as one non limiting example or an accelerometer 118 could be used to check that the pill box as a whole as been moved consistent with opening of the pill box and at approximately the assigned times or at whatever time the box is moved and to what amount.

The pill box has an entity device attached to it and integrated into the box if contact switches are instrumented with a multiplicity of contact switches attached to a multiplicity of wires connected to the inputs on the entity device. The entity can be programmed from the mobile computing device to expect the pill box be opened moved for one or more specific times of the day as well as days of the week. The programming can be done in both or either of the software in the entity device or the Mobile Computing Device 102. The pill box is then monitored by the attached entity device to see whether it is moved.

The pill box can operate with several modes, in one of several modes, firstly, the Entity Detection Device 110 is awoken from sleep mode whenever the an event occurs and attempts to communicate the event to the Mobile Computing Device 102 so that that the Mobile Computing Device 102 can also inform a remote carer such as a nurse and they can have positive confirmation that the medication event occurred. Secondly, the Entity Detection Device 110 is awoken from the sleep more when an event occurs and a timer that has been set to confirm the medication event is cancel because the user medicated but if the a timer is not cancelled then the user is reminded and then if still no medication event occurs then a remote carer is informed. Thirdly, medication events are recorded and periodically reported.

The pill box can have configuration data such as medication times etc programmed by pressing a button on the pill box to enter configuration mode or it may listen for a configuration request event from the Mobile Computing Device 102 at certain times at which the configuration data is sent.

If the mobile computing device is not in range of the Entity Detection Device 110 this is also reported as this is a different state to having positive or negative confirmation of a medication event.

Audio or visual alarms on the pill box or the Mobile Computing Device 102 can also alert the user if they fail to medicate.

When the pill box needs to have medicines refilled this refilling process can be signified to the entity device to distinguish if from the taking of a compartments medicine, through pressing a button on the pill box or the phone at the time of refiling on the entity device or the acceleration can be monitored on the device and an unscheduled acceleration, opening of contacts, ignored as assumed to be the refiling process. The refiling process can also be recognised if many contacts are opened simultaneously or in quick succession or if the acceleration is characteristic of the refiling process as configured from software settings set from factory settings, recorded from the customer refilling the device.

In another embodiment the same concept as for pill box could be applied to Brushing teeth, flossing and other such hygiene activities. The Entity Detection Device 110 and accelerometer 118 as well as optionally a gyroscope 119 may be attached and re-attached between changes in tooth brushes and flossing containers so as to be re-used or alternatively they may be permanently joined.

The amount of acceleration and time as well as angles of movement as measured with an additional gyroscope 119 which constitute adequate movement and so brushing or flossing may be recorded for an individual or taken from a library of recorded acceleration sequences, the sensor pattern database 195.

Regular brushing or flossing may be used to earn time on a game console or points towards a virtual of physical prize or movement through a game.

The game may be styled in such a way as to reinforce the message of dental hygiene.

Result 1002 reported for activities performed as recorded by an Entity Detection Device 110 can be sent to a server 1001 where they can be tracked by person, family member, health professional each day.

In one embodiment, it is desirable to have a portable security system for example when travelling it is seldom possible to be sure how safe a hotel door lock system is. This system consists of a passive infrared detector (PIR) and/or accelerometer 118 that can be placed in front of a person (perhaps in the entrance to a room) facing out of the room in the direction that an intruder may approach, or in the case of an accelerometer 118 on the door. The entity detection device fitted with PIR can then send signals if it detects movement to the user's Mobile Computing Device 102 placed next to the user which will raise an alarm and/or start a countdown which if the user does not cancel it will cause an alarm to be sent remotely or if there is a hub 109 for the hotel to the hotel security staff.

In one embodiment, it is desirable to have portable security system for example when travelling it is never possible to be sure how safe a hotel door lock system is. This system has a consists of a passive infrared detector (PIR) and/or accelerometer 118 that can be placed in front of a person perhaps in entrance to a room facing outward of the room in the direction that an intruder may approach or in the case of an accelerometer 118 on the door. The entity detection device fitted with PIR can then send signals if it detects movement to the user's Mobile Computing Device 102 placed next to user which will raise an alarm and/or start a countdown which if the user does not cancel will cause a alarm to be sent remotely or if there is a hub 109 like for the hotel to the hotel staff security An Entity Detection Device 110 with an attached PIR can be configured to be turned on by an Mobile Computing Device 102 when it detects an unsafe time or location.

A PIR attached to an Entity Detection Device 110 could be used for example to watch a location where a car is parked at night so that if anyone approach u can be warned or depending on configuration if they are present for a certain amount of time. The Entity Detection Device 110 with attached PIR could communicate with a hub 109 for a whole block of departments and when an event is detected one or more users connected to the hub 109 can receive the alert, or receive if the user is not connected to the hub 109, a signal can also be sent to the user if he is remote to the hub 109. A white list of people can be programmed so that the Entity Detection Device 110 or the mobile computing device receives a broadcast sent from phone of for example a cohabitant it will not activate the alarm if they enter and are detected by the PIR This PIR and accelerometer 118 mounted Entity Detection Device 110 and system can also be used to protect sections of house that people can go or not go into, Or touch or not touch.

The PIR can be linked to hotel or a hub 109 or set of hubs 109 in a set of units and the hub 109 can detect any other users who are in the hub 109 or set of hubs 109 who are configured to receive the alert on your behalf. The alert can be sent via SMS, internet or from the bluetooth to other Bluetooth devices.

In another embodiment an additional bluetooth entity device 110 separate to the entity that can act as an alarm with a noise alarm such as piezoelectric alarm or any such form of very loud alarm or display with a more advanced power light source component with great capacity allowing shareable resources attached to the hub 109. The alarm may be fitted in common walkway areas or dangerous spots as a shared resource that any panic alarm system can use in an emergency. This alarm may alternatively be a mobile computing device 102 and communicate using wireless or internet with a central security location such as if the alarms were placed on a university campus reporting back to a central security command. On a university campus, students own mobile computing devices 102 may also have their panic alert configured to be sent to the same central security command.

The alarm may also be placed personally on the being a bit bulking in a bag 299 or built into a bag 299.

Mobile computing device applications presently allow a user to trigger a panic alarm alert by pressing a button on the application, It is difficult to manage the operation and implementation of these applications to allow the user to at any stage conveniently trigger the alarm by pressing a button on the screen. For example the application should always need to be the to most application, even when the user is listening to music as one example. Also the screen should never be allowed to lock otherwise the button may not be able to be accessible to be used. The screen will also use a lot of power if always on.

A problem faced by present solutions includes how to prevent the panic button from being activated as a false positive during times when the button should be disabled.

In one embodiment, the entity detection device 110 consists of one or more panic buttons 119 which when pressed send a signal such as a Bluetooth Low Energy signal to a mobile computing device which can then alert a remote party via internet, SMS or email. The panic button may consisting of one or more non limiting examples including contact, capacitive or pressure sensor of various sizes. Depending on the situation as specified by the user and/or location and associated risk as determined by consulting a database then the mobile computing device listens and receives the panic button signal if pressed in those situations only, this saving false positives and the mobile computing device battery. The user can use the mobile computing device to also record the start, stop and midpoints of a journey, or times and length of time for journeys of dangerous times of day or access local or remote information security information including also crime statistics.

People can also vote an area as dangerous explicit or if they turn the panic button into a dead handle, or countdown to alarm mode. If the mobile computing device application notices that a person regularly travels an area it may also ask the user to vote the safety of this area. The information can be reported to a map of critical dangerous areas. When the panic button 119 is pressed and the mobile computing device is configured to receive the trigger it may send the alarm straight away or begin a countdown. The countdown itself can also be configured to be silent or alert the user by vibrating or by sound or combination, again being configurable based on the situation. The panic button entity that has button and one or more cancel buttons. Separate to phone so that can be easily access and cancel a countdown by pressing one or more button in a pre-described order, a second order of buttons can be defined to send the signal straight away to a remote party.

The panic could also be built into or attached to a watch band/or smart watch. The panic button could be part of smart watch also. The panic button could be built into earphones with button placed on the earphone and the Entity Detection Device 110 inside on or other of earphones and/or with the us of the accelerator so that if falls out a countdown starts on the mobile if not cancel sends location to 3$^{rd}$ party. When the user is concerned for example as a stranger approached the selection of one or more button can put the entity device and/or mobile computing device in a countdown mode preconfigured, if the danger passes without the user cancelling the alert will be triggered. The panic button is useful for example for a dad to give to her daughter going into a female toilet he cant enter as one non limiting example. Trains, bus, and other fixed locations have panic button stations installed where pressing a button will call a security guard or alert others to help. A problem with this is that users cannot always reach the button.

In one embodiment this system describe could allow the panic button entity device to communicate with this panic station which would act like a hub 109, and in this way the hub 109 can be listening continually for connections and when the panic button contacts then the alert can be sent to the security guards including also an ID so that the person's information can be known to help identify them as well as their position. In locations underground in build where the location can't be fixed it can still be exactly fixed to the location of the hub 109 even if moving a train carriage. An ID can be blocked for panic button misused or stolen In one embodiment, instead of the triggering a panic alert from the panic button, it can be triggered by the measurement of movements to detect if a person has fallen over. The accelerometers 118 and gyroscope 119 on the entity detection device 110 can be used to compare movements to those typical of a fall and if so detected trigger an alert to the user. Characteristics about the movements for the fall can be stored in the database 137 for the panic device.

It is a common problem for parents and/or spouses, family members to be worried about their family members when they are travelling between locations. A method would be desirable to allow family members to monitor their travelling family members and so even if nothing is wrong the fear of not knowing if their safe can be removed.

The system can be used to track the return of a child or partner from school or work as they pass a point with mobile computing devices acting as hubs 109 without needing to have mobile computing device with GPS and internet access but instead a smaller entity detection device. It is particularly useful for children who don't carry a mobile computing device with internet and GPS. When they come into range of the hub 109 the Entity Detection Device 110 sends an unique identifier (ID) for the person to the server through the hub 109 that has a connection to the internet through which it can communicate to remote user with an internet enabled device such as mobile computing device.

The entity detection device can be pre programmed by the parent or spouse to be listening at certain times with a certain frequency for signals from hubs 109 to which the entity responds with an ID or to broadcast at set time ranges and intervals so that as the person passes by a hub 109 there is a sufficiently high frequency of polling to ensure that the signal is not missed by a hub 109 as the entity device goes by, but that at other times the device is not using battery unnecessarily and draining it. The system is designed for the entity device to be listening then it response with it's identifier that the hub 109 sends to a server and to a remote user which has been associated in a configuration database to receive the information.

Hubs 109 could include around school gate to detect departure and arrival from school where as described when the entity comes in range of the hub 109 an ID is communicated and a report sent to the persons monitoring remotely. Hubs 109 could also be installed on the bus, at common public places, safe house for children could have them installed to detect child as walk by, as well as a hub 109 at home so that again if the person monitoring is remote to the home location also they can know that the child reached home safely. For example, this would allow a parent waiting on the bus stop not to need to wait till the bus to arrive and their child not be on board before searching for the child alerting the teacher.

Additionally, other family members or carers who may for example be picking a child up from school can have an application or entity device that also indicates their presence in the zone at the same time as the child to allow for situations where another authorised person takes a child out or accompanies of a zone but all other family member(s) monitoring can still be informed. The described panic button system allows the safe tracking of shift workers, nursing staff and university staff and students a few non limiting examples. Nursing car parks and university campus are closed environments where the alerts can be sent back to a local security guard already setup to assist.

Staff travelling home across a city also need a system to protect them, the panic button system utilises existing infrastructure in the form of the mobile computing device 102 to transmit safety information to third party such as family or security personnel who may belong to companies currently with staff constantly in many areas performing patrols who, incentivised but a fee charge when the button is pressed will respond to the call. In an alternative embodiment, the when the panic button is pressed the user may receive an alert, coded or otherwise indicating the time for a guard to arrive.

Many people live alone and have no one who will be aware if they do not return home each evening, including the elderly as well as single people living alone. Such a system can be configured to detect and report the safe arrival in the home zone or the progress of the entire trip. A common need for cyclist and motorbike riders as well as children is to be noticed by car drivers. Many drivers are very concerned to keep alert for cyclists and motor bike rides but it is a known issue that they are easy to miss in traffic or when the driver is not concentrating or the motorbike is in a blind spot. Another hazard for motorists is to notice children nearby particularly when parking. The user's mobile computing device can generate an alert when cyclists, motorbikes and children wearing the entity detection device using any of the aforementioned monitoring methods connects or discovers a mobile computing device and the user is identified as in the zone of their car identified by a Bluetooth beacon or tag in the car or by inferring that the user is travelling by one or more combinations of accelerations, gyroscope activity or travel path analysis from locations analysis such as GPS, combined also with optionally asking the driver to confirm activities are associated with driving to subsequently recognise these times, geographical paths as car travel times.

In another embodiment, a tent door including both zipper opening or other methods of closing, or accelerometer 118 on the tent can be instrumented to see if the it is opened and the a mobile computing device nearby perhaps the user inside the tent could be alerted or if remote to tent a hub 109 in the caravan park or left inside tent to monitor it or in a car near by could relay an alert to a remote person such as user or security. In another embodiment, a tool box lid, accelerometer 118 on the lid of whole box can be instrumented to see if the it is opened and the a mobile computing device nearby perhaps the user nearby could be alerted or if remote a mobile computing device in the box in a car near by could relay an alert to a remote person such as user or security. Similarly to a toolbox, individual tools could also be protected in this way. In the described embodiments throughout this description, a primary form of system is using low power RF such as, but not limited to Bluetooth Low Energy, otherwise known as Bluetooth smart or Bluetooth 4. Combined with processors with lower power in sleep. It is further assumed that the typically processes also have analogue to digital converter In some embodiments, the methods described for a bag 299 can be applied to wallets, purses, camping back packs, sleeping bags 299, travel bags 299, lap top cases as well as for detecting if the a person is wear a coat and jacket which is zipped up.

In another embodiment, if a mobile computing device detects that the user has lost GPS or radio signal or gained internal positioning (IPS), then it can make an hypothesis that the user has entered a building, and at this stage it can send a signal to any entity devices to see if there and then when GPS or radio is regained it can check those items are there and prompt the user they may have left them behind. In this way, without geographic lookup or database can deduce locational changes of importance including entering and leaving a building. In some embodiments, a fixed hub 109 can be is used to perform occasional or continuous audit tracking of asset each with a entity device attached. Example assets may include computers, chairs, tools. If someone attempts to move an asset as detected by accelerometer 118 or break a sticker with a wire embedded that breaks a contact switch causing a circuit to be opened and the Entity Detection Device 110 is sleeping waiting for an Input/Output event to wake up and trigger a signal to the hub 109.

Other connections could include magnetise contact switch, loss of pressure between the object and the entity or another other form of switches as widely known in the security field of art. In cases such as theft tracking to track the movement of the equipment where the Entity Detection Device 110 remains connected to the entity but the whole entity is moved the methods described for monitoring a child in areas of safety could be employed. In additional to real time asset checking if it may be sufficient to get occasional synchronise as once a day, week, month. If it is important to regularly establish the location of the object then any of the monitoring modes may be employed and Additionally in a similar way to the monitoring of bags 299 previously described.

When a entity is detected to have been moved or opened then an mobile computing device or local registered person in the office, or a local alarm can be triggered if the person is not there or in addition to the alarm or camera activated in that otherwise or also a remote message for example to a security guard. Additionally an auditor that enters a building a walks through can also transmit a signal, if the devices are designed to listen for the auditor at a time and/or day of week, or have one specific time each week where they listen and can be set by mobile computing device to be ready for an audit at a particular time then this can. In addition to assets in an office this technique could be applied to monitoring goods in a shop against theft. As soon as the objects are moved, the Entity Detection Device 110 may also immediately wake up and start sending updates of their position until they stop moving allow a system to track if their movement is may indicate theft such as by their movement towards the door without passing past checkout. The position of the device can be determined by the calculate of distance by signal strength such as RSSI or other methods using low power RF of one or more receivers or transmitters from the entity.

In addition to monitoring when an asset is moved, it may be important to have an item provide regular updates to prevent a thief Shielding or jamming the signal that would be performed by thief to prevent the warning signal being. In this way the hub 109 can deter something may also be wrong if heartbeats not received. The system should also attempt to scan for jamming signals.

In some embodiments, processing of data can be performed at the Entity Detection Device 110 and/or Mobile Computing Device 102 or distributed between the two devices. In some embodiments, a fixed hub 109 can monitor doors in a building to see if they are opened using magnetic switches, contact switch accelerometer 118s and the like. Changes in states or continuous states of interest such as open long time can be transmitted to the hub 109.

In some embodiments, activities that should be performed regularly such as the cleaning of an office can be monitored for example, the cleaner can be fitted with Entity Detection Device 110 on their person or cleaning equipment can be fitted with an Entity Detection Device 110 so that when the equipment is moved as measured by the accelerometer or turned on or the cleaner moves the hub 109 can be alerted by any of the monitoring modes. Additionally if the cleaner or equipment Entity Detection Device 110 are out of range of the hub 109, then when the they come into range then the information can be collected. see description of "monitoring modes".

Alternatively, the cleaner's own mobile computing device could act as the hub 109 sending the information about their location and activity from and including from an IPS using triangulation using low power RF or GPS and also movement information including but not limited to accelerometer 118 and/or gyroscope 119. Optionally movement information including location, accelerometer 118 and/or gyroscope 119 can be used to detect styles of movement indicative of a cleaning activity being performed. Previous cleaning location and movement information can be recorded and compared with current measurements to determine how thoroughly an areas is being moved this information may be sent immediately in real time via the Mobile Computing Device 102 or collected and sent at certain time intervals. In addition to cleaners the principles can be applied to maintenance and home care staff as well as the monitoring of security guards, hotels staff.

The hub 109 can have an ID, indicating the location which can be sent with information from the entity detection device 110 such as movements, time and also the person present (as identified by an ID from their mobile computing device 102 or 110, if on their person). If the data is sent from the user's mobile computing device then the hub 109 ID can be sent also to identify in what area the data was collected.

To assist cleaners and service personnel to avoid unnecessary cleaning and call outs, toilet doors, sanitary bins and shower curtains, taps can all have an entity detection devices 110 placed on them with accelerometers 118. When they are moved then a message can be sent via a hub 109 to a remote person 102 or system allowing them to know when a facility needs to be serviced. In this way the personnel can avoid unnecessary checking if equipment has not been detected as used. A hub 109 can be used as a bridge between a blue tooth low energy and WiFi networks allow entity detection devices 110 to transmit to remote mobile computing devices 102 via the WiFi connection. In this way a low cost mobile computing device 102 without a mobile carrier can be used. Monitoring is required to ensure workers on building sites or doing other high risk work comply with safety requirements to wear safety equipment.

Figure 9:
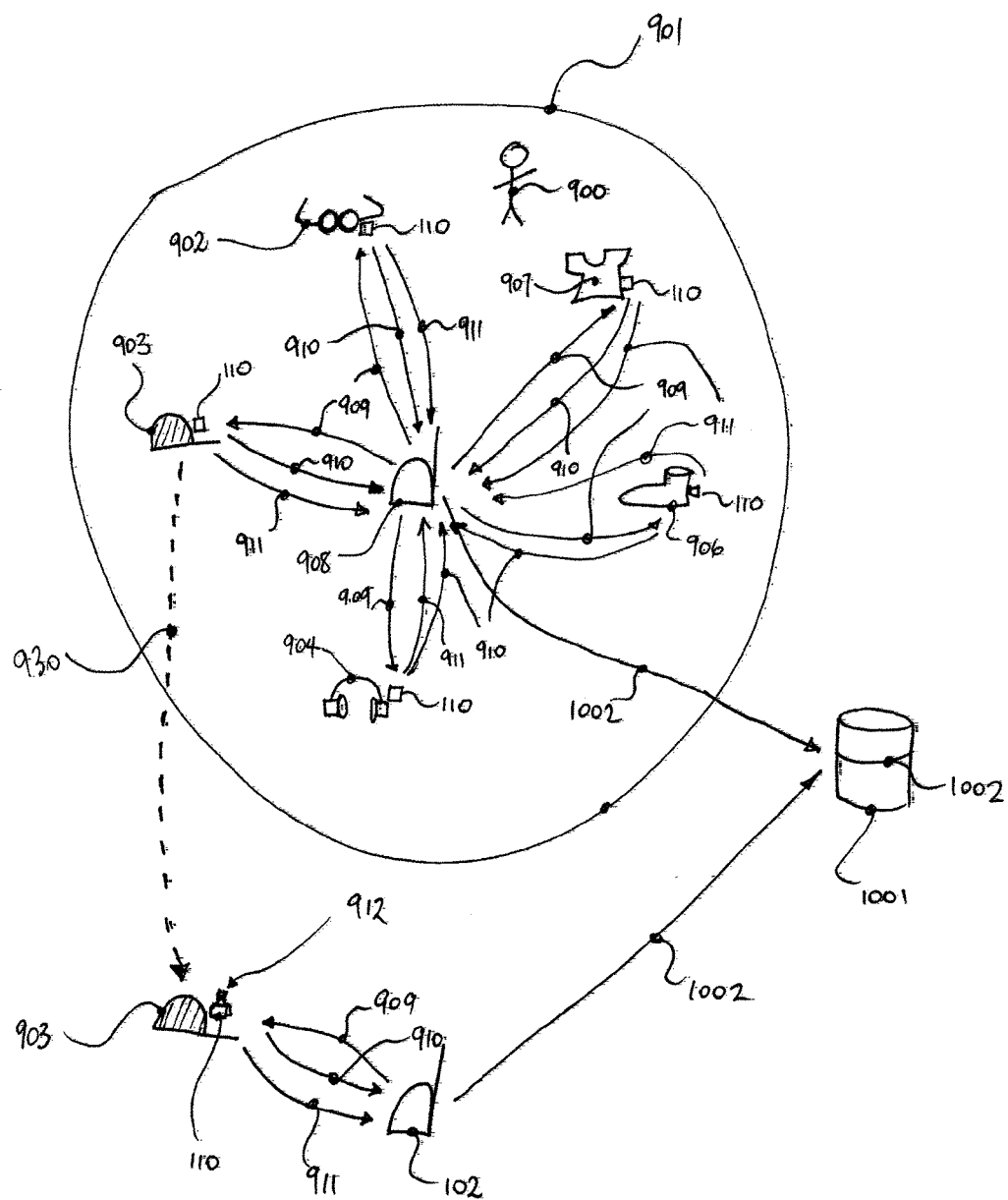
FIG. 9 shows a safety monitoring system to measure in real time (or log for later review) the habits of workers (compliance) in wearing safety equipment

Referring to FIG. 9, as a further example of this monitoring from a hub 908 in a fixed position or person's mobile computing devices, a worker 900 in a potentially dangerous work site 901 can be monitored to check that she is wearing as non limiting example of safety gear, safety glasses 902, safety hat 903, ear protection 904, sunscreen 905, safety foot ware 906, and safety clothing 907 each fitted with the entity detection device 110. In one mode of operation, the hub transmits a signal 909 periodically and the entity detection devices 110 mounted on the safety devices 902, 903, 904, 905, 906 and 907 checks at various intervals during work days and times or as per a calendar, or receive this signal and if they are being used detected by contact switches fitted to measure the pressure of someone body wearing them or by accelerometers then either the device 110 transmit back 910 an score or points or other such acknowledgement to the hub 908 or alternatively, collects and stores the score and at a later time 930 when connected to a hub such as a mobile computing device 102, then the score information 1002 which combines a user ID, time, duration, score, and optionally which safety devices worn as well as location is transmitted to a remote score database 1001. From here the a worker could receives incentives such as prizes, payment for work if they were wearing the helmet and penalties if they are not wearing safety equipment. In another mode, the entity detection device 110 detects acceleration (or switch 912 pressed) and then it checks for an hub location is transmitting 909 and then transmits back 911 information such as combines a user ID, time, duration, score, and optionally which safety devices worn. Results uploaded from hub 908 or 102 to 1001 as 1002. can Unlock payment for work, bonus competition entry or, compliance data, including for insurance and government.

Figure 8:
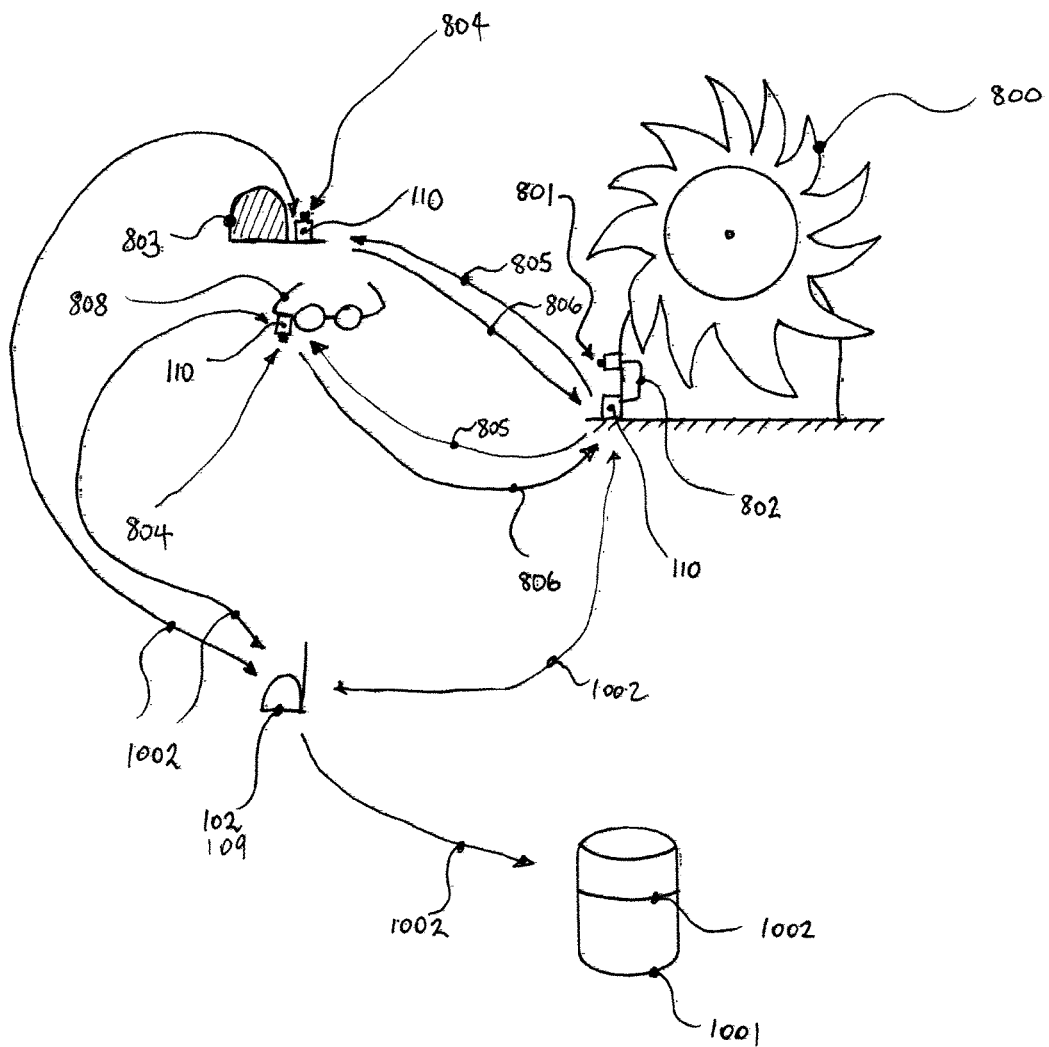
FIG. 8 show a safety system to prevent machinery from running if workers are not wearing their safety equipment.

Referring to FIG. 8, the monitoring of wearing of safety equipment by a monitoring hub 109 or otherwise can be extended to prevent dangerous equipment 800 function, or at least record who has used equipment when it is turned on when no safety equipment is being used. This is done to ensure that safety gear is being warn around dangerous equipment which within a general work site is a particular more dangerous period of the work day. Dangerous equipment may include ride on mower, chain saw, industrial equipment, earth moving equipment as some non limiting examples.

In one embodiment, If it is only necessary to monitor who is using the equipment when it is turned on then when the on button is pressed 801 to turn on 800 connected by wires 802 to the entity detection device 110, it causes the device to function as a hub 109 transmitting a signal 805 to the entity detection device 110 on the safety device 803 which can then log or record that it was being worn as detected by contact switch, pressure, or accelerometer 118 or by pressing of a button 804 or when acceleration 118 is measured, the device responds back 806 to the entity detection device 110 that the hat 803 or glasses 808, ear protection, or safety boots as some non limiting examples are actively been used.

If the safety equipment 803 has or is being warn then later when 102 or hub 109 is in range, the device 110 on 803 can communicate the logged information to the 102, 109 from where points or events 1002 can be logged for later analysis and for example the awarding of points for compliant workers. Additionally if the equipment is not configured to turn off and if no safety gear are detected, the entity detection device 110 on 800 can record and when 102, 109 in range transmit 1002 each event and time of non compliance for investigation. An advantage of this system is that the contact switch, pressure, or accelerometer 118 on 803 needs to be close to the 110 on 800 to a configured position such as 1 m and being used to allow usage of 800. In one embodiment, the entity device 110 attached to the child's wrist band/or optionally shoe or, shoe lace can be also be in a monitoring mode wherein it listens for broadcast from a mobile computing device 102 that is sending a signal when a driver is moving his car or broadcast a signal that a driver's mobile computing device 102 can detect to allow drivers to know when children are close to the moving car.

Figure 10:
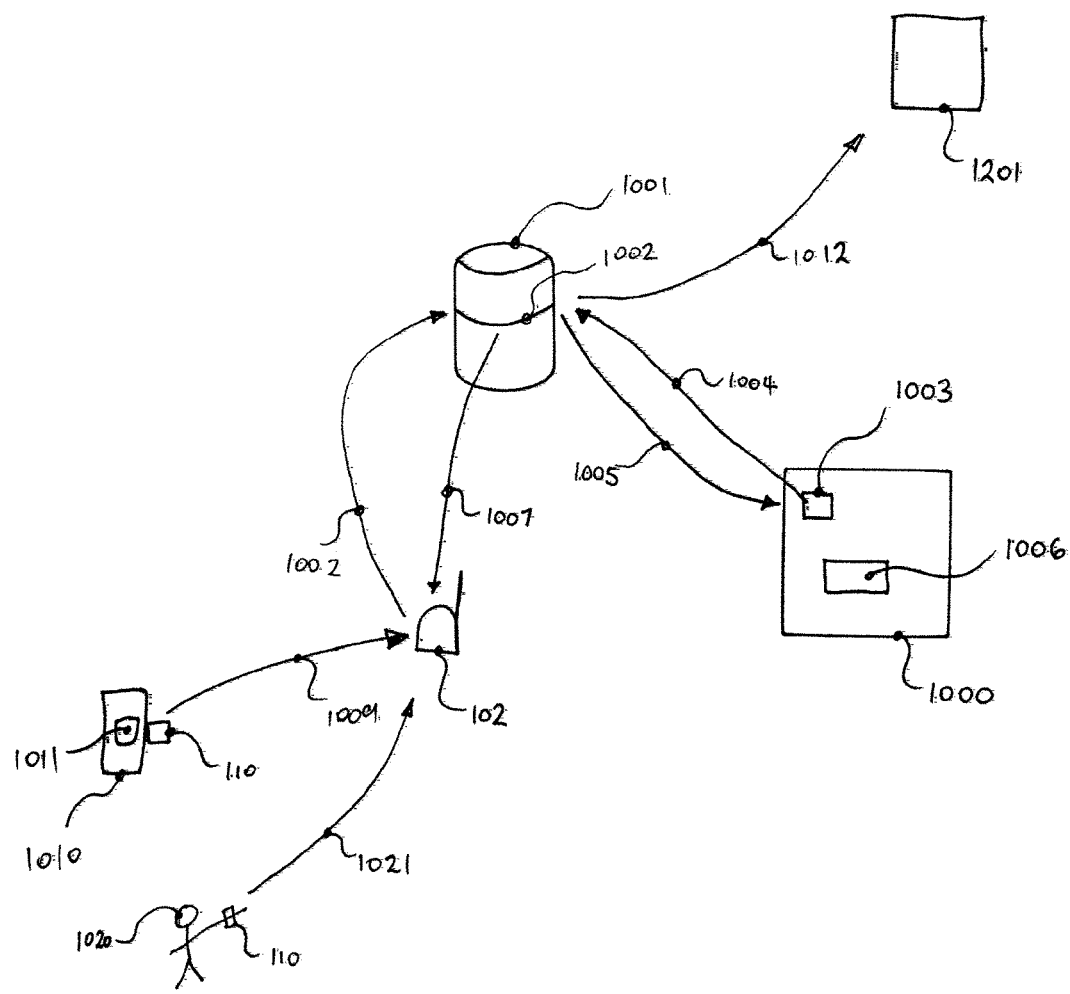
FIG. 10 shows a system to restrict use of electronic devices until real world work or activity (as some non limiting examples) is completed.

Referring to FIG. 10, it is desired by parents to restrict access to computers, games consoles, tablets, smartphones or TVs as excessive usage of them is not good for child development. The system described controls the access to such devices (computers, games consoles, tablets, smartphones or TVs) 1000 such as allowing users including children to only have access to devices 1000 in a restricted regime when they have been allocated time by a parent or optionally as a reward event 1002 for completing work where the allocation of time or points 1002 is stored in a server 1001. These time or points may have been added to the server as a result of the parent giving time manually using their mobile computing device 102 display or from a multiplicity of sources such as in one example an sunscreen application event 1009 where a parent wishes to reward a child for apply sunscreen, where the child presses a button 1011 attached to device 110 mounted on a sunscreen tube 1010 when she applies sunscreen. As another example, time points 1021 could be given where a parent wishes to reward a child playing actively outside 1020 as measured by the accelerometer 118 on the entity detection device he is wearing.

When the device such as tablet 1000 is turned on or accessed, or moved, or specific software on 1000 are used, software monitoring in the background or foreground, accesses 1004 the remote server 1001 and locates for the user associated with the device a score or points record 1002. The number of points retrieved 1005 is used to determine how the user may use the device 1000. For each time period of use for example 10 mins the number of points 1002 is decremented and updated 1004. Should the retrieved number of points 1005 fall below 0 then a message 1006 is displayed to the user to tell them they should no longer access the device (and optionally usage of the device is disabled). A message is also sent 1007 to the mobile computing device 102 user such as parent to tell them all points have been used and if user persists, the user may also be blocked from using the Communication 1004, 1005, 1007, and 1002 can all be via Bluetooth Low Energy, WiFi, internet or cable.

Any attempt to remove the application may also be prevented and/or a warning sent to the parent. A regular heart beat signal reporting that the application has remained installed on device 1000. An alternative configuration would be to place an entity detection device 110 on the tablet or other device along with also a connector between the device 1000 and the entity detection device 110 such as pressure, contact switch or contact switch in sticker (damaged when remove or many other forms of tamper protection) then a report sent to mobile computing device 120 of the parent when movement of the device is sensed with no points 1002 available.

In the case of controlling TV 1201 usage, a device 110 can be fitted with an amplifier and relay which can switch the main voltage which powers a TV. The amplifier takes the TV time reward output signal 1012 and increases the power to drive the secondary coil of the relay and turn off and on the TV 1201. In one embodiment, the habits of children about saving energy could be developed by placing entity detection devices 110 on doors, blinds, dressing gowns, which measure that they are closing doors and wearing warm clothes by accelerometer or contact switches as some limiting examples and temperature gauges in rooms fitted to entity detection devices 110 which are reported to device 102 and on as events and/or points 1002 to 1001. When energy saving practices are monitored such as the closing doors, blinds and wearing warm clothes fitted with accelerometer to detect wearing are followed and optionally the temperature is maintained then points 1002 are rewarded to a score database 1001.

By these methods, the receiver users are empowered with a method to check With the growth in antibiotic resistance all possible techniques to reduce transmission of diseases are vital.

Additionally if the cleaner or equipment Entity Detection Device 110 are out of range of the hub 109, then when the they come into range then the information can be collected. Alternatively, the cleaner's own mobile computing device could act as the hub 109 sending the information about their location and activity from and including from an IPS using triangulation using low power RF or GPS and also movement information including but not limited to accelerometer 118 and/or gyroscope 119. Optionally movement information including location, accelerometer 118 and/or gyroscope 119 can be used to detect styles of movement indicative of a cleaning activity being performed. Previous cleaning location and movement information can be recorded and compared with current measurements to determine how thoroughly an areas is being moved this information may be sent immediately in real time via the Mobile Computing Device 102 or collected and sent at certain time intervals. In addition to cleaners the principles can be applied to maintenance and home care staff as well as the monitoring of security guards, hotels staff.

In some embodiments, activities that should be performed regularly such as the cleaning of an office can be monitored for example, the cleaner can be fitted with Entity Detection Device 110 on their person or cleaning equipment can be fitted with an Entity Detection Device 110 so that when the equipment is moved as measured by the accelerometer or turned on or the cleaner moves the hub 109 can be alerted by any of the monitoring modes. Additionally if the cleaner or equipment Entity Detection Device 110 are out of range of the hub 109, then when the they come into range then the information can be collected. see description of "monitoring modes"

In some embodiments it may be desirable to sense whether a tap in the garden or in the house has been left on by mistake by someone when busy or by an elderly person who is forgetful and have the user or a third party remotely be able to check or receive a warning when this occurs. This would be desirable to prevent water wastage or flooding of an apartment or house. The entity device can sense this using a hall effect sensor to detect the flow of water, accelerometer flow of water by vibration or noise or moisture. The detection of water flow for a certain amount of time or volume determine by the magnitude of the sensor reading or combination of volume and time can be used to trigger an alert to be sent to the mobile computing device or hub 109 from the Entity Detection Device 110. If the person doesn't respond then an alert is sent by a fixed hub 109 in the house to the a remote user.

In some embodiments, where a mobile computing device fixed hub 109 exists for example in a block of units, flats or apartments, then the Entity Detection Device 110 can monitor when shared devices such as a washing machine are turned on by way of integration into the device itself for example into a washing machine where the interface panel including on and off buttons and length of time remaining as some non limiting examples can be connected to the Entity Detection Device 110 so that it can communicate to a user via their own mobile computing device or via the hub 109. This will allow a multiplicity of users in a block of flats or units to coordinate the usage of shared resources and equipment not limited to but including washing machine, dryer. All users can see when a machine was started, how long remaining, the user currently using, and book time slots. If a user specifies it, any equipment belonging to them may be configured to use the hub 109 to communicate using the low power RF to other users, devices or a remote person when the user is not present and including also when the user is present and does not respond.

In a similar manner, an Entity Detection Device 110 and/or a second local user's mobile computing device can both be configured so that if an alert that has been configured so that when the movement of a bike 150 secured in a common area of a flat reaches a certain threshold indicating a potential theft attempt in progress, then in addition to the owner, other apartment block members in the same set of apartments and hub 109 could be alert and/or an alarm linked to the low power RF hub 109 also activated. The system could be designed so that only if the user's mobile computing device is not in the hub 109 area will other apartment block members be alerted. A PIR detector on an entity detection device 110 could also be used protect areas where it is expected that people should not go or loiter as particular times of day. For example a car park could have a series of PIR Entity Detection Device 110 monitoring cars and if anyone comes in this area and by triangulation of distance to bluetooth beacons is detected and there is no one in that are area who has an ID that when polled by the hub 109 is in a "white list" of allowable people then if the loiter time is over a level then the car owner(s) connected to the hub 109 in that area will be alert.

In this way a social form of security can be created with apartment owners working together to protect each other and their property and gives them tools to be aware of security issues in their area. It means for example, that if a neighbour hears a noise and cannot raise their neighbour but there was a panic button pressed that they have some objective information for the police.

It also means that even where there is a theft there will be telemetry for the time of the event. The detection mechanisms can be combined with triggering security camera recording. The general provision of extra information for other people to use may reduce the reluctance of people to assist as they often feel they do not know whether they are over reacting to noise they heard as opposed to a real problem. When neighbour also give all or individual neighbours permission they feel some engagement. The ability to communicate on a network that is truly local allow a set of otherwise isolated neighbours to vote and discuss issues such as noise levels or policing issues as well as vote on a solution that is acted on by a moderator. As another example, pegs for clothing, clothes, or clothes lines can have Entity Detection Device 110 attached to warn against clothes theft. Residents can share ownership of watering plants in common areas or each others flats y receiving alerts through a Bluetooth hub 109 by either the signal Bluetooth hub 109 signal or group of them relaying messages by bluetooth or mixed with cable and/or internet between hubs 109 depending on the size of the block of apartments of building.

Additionally, IPS using low power RF triangulation can be used to locate and warn when a person is in the wrong place. The Entity Detection Device 110 communicates to one or more users Mobile Computing Device 102 or optionally also by a hub 109 if present to remote users Mobile Computing Device 102.

In some embodiments, the Entity Detection Device 110 and Mobile Computing Device 102 can communicate with any of the monitoring modes, with a Mobile Computing Device 102 able to concurrently monitor one or more Entity Detection Device 110 as well as an Entity Detection Device 110 be concurrently monitored by one or more Mobile Computing Device 102s, including Mobile Computing Device 102 acting as hubs 109 as well as remote user Mobile Computing Device 102 which receive data and alert from the hub 109 via communication methods including but not limited to internet, SMS, email.

In some embodiments the mobile computing device may be smart devices, smart phones and tablets, smart watches, as well as all kinds of portable computing devices with low power RF as well as optionally able to communicate using other forms of WiFi, mobile network communication, Examples of such devices include but are not limited to devices running iOS, Android and Windows operating systems. The term can also be applied to laptops and may also include desk tops and be broadened to also include fixed computers configurations. Additionally, where mobile computing devices are mentioned as fixed this may included mobile computing devices that are portable in characteristics including size and weight and connection to a network that accessible while the device is moved by has been placed in a fixed, or to some degree unchanging position.

Power to the mobile computing device is assumed to provided from a source that can used to constantly supply the charge or recharge a battery in the mobile computing device.

In some embodiments the entity devices can also include all kinds of mobile computing devices. As one example as smart watches such as iWatch can be taken off and potentially left behind when changing after sport as one non limiting example, The iWatch could operate, including in its application software in a similar way to other Entity Detection Device 110 for purpose of it being protect from loss as described in this disclosure. However the iWatch can also operate as mobile computing device for the purpose of monitoring other entity detection devices.

A smart watch may also act as a mobile computing device. The Power to the entity device is assumed to provided from a battery that is generally small and not rechargeable and needs to be conserved with minimal usage to extend the life of the battery including trying to maximise sleeping time, and receiving as opposed to transmitting time however it could also be considered that it could be connect to a source that can used to constantly supply the charge or recharge a battery.

In some embodiments, the distance between the entity detection device and mobile computing device can be determined by using signal strength calculations using low power RF transmitters and receivers such as RSSI. Low power RF methods may including but are not limited to Bluetooth classic, Bluetooth Low Energy also known as Bluetooth smart and Bluetooth 4.0. In some embodiments, Low power RF methods may including but are not limited to Bluetooth classic, Bluetooth Low Energy also known as Bluetooth smart and Bluetooth 4.0. In some embodiments, the distribution of monitoring and processing of data can be spread to various degrees between the Entity Detection Device 110 and the mobile computing device software and processors. For example, in the case of the monitoring acceleration of an entity detection device which is to be monitored when a the mobile computing device notices the user has entered a new location or area, which requires careful acceleration monitoring to be performed to see if for example a bag 299 is lifted up or moved in a purposeful manner for some reason that the system may wish to deduce, then a software algorithm can be applied to the movement data in either the entity device or the mobile computing device. All algorithms for movements as well as other algorithms for other purposes can be applied in software and/or additional hardware on either and/or both the entity device and/or mobile computing device.

In some embodiments, acceleration, compass and gyroscopic data can be collected from the entity device and/or the mobile computing device and used to determine if certain kinds of movement have been performed such as the purposeful movement of a bag 299 away from a person indicating for example that the bag 299 is being taken away as for example in one instance a possible theft.

In some embodiments, the user sets the panic button into a count down state which will cause an alert to be sent if a single button or multiple buttons 119 is not then issued to cancel the countdown.

In some embodiments, the transmitting of a signal or alert can be achieved by a device advertising and/or making itself discoverable without then need to form a connection. For example, if a bag 299 is opened the Entity Detection Device 110 can sense this then by turning on and advertising it can be considered to have communicated an alert. In some embodiments, the alarm may be of various volumes or visual appearances or battery usages depending on whether the mobile computing device of entity device and also on the power connected. In some embodiments, all known methods can be used to send a remote message or alert from the mobile computing device to a remote such as SMS, data sent by internet, or recorded or live voice and video data. The message sent may include information such as the GPS, Bluetooth beacons or transmitter ID nearby as well a day and time.

In some embodiments, the remote server may include a database, and software to collect and process information according to various algorithms, and be able to contact other users via their mobile computing device including by SMS, data sent by internet, or recorded or live voice and video data. In some embodiments, advantage is provided by prolonging the battery life as this means that the device may use very little battery and so approach the shelf life of the battery or at least long periods of time which match or exceed the stated or anticipated expected life time of the device so that the casing can be arranged in a manner where the battery is permanently sealed to save costs and/or improve water resistance.

In some embodiments, the said monitoring modes can be applied to the warning when a child wearing an Entity Detection Device 110 and a parent with Mobile Computing Device 102 are separated by distance and the Mobile Computing Device 102 using location sensing such as GPS identify that the child and parent are in an area of risk from traffic danger for children. The distance after which an alert is given can also specified and adapted according to the traffic risk in the zone. The child can receive warning on his Entity Detection Device 110 if he is beginning to move away from the parent. The zones can be very specific with distances less than for example 0.5 metre as one example, when right near the edge of a road.

In some embodiments, where many different separate software applications 104 in the mobile computing device 102 are concurrently monitoring such as polling for the purposes of listening and/or transmitting for connections using lower power RF between mobile computing devices 102 and entity detection devices 110, then the software 104 on the mobile computing device 102 can be consolidated or combined or in other ways partitioned in to a separate application or service for the purpose of overall performance efficiency. The said combined application, software or service can call back other individual applications when events occur or on the status of regular polling done on behalf of one or more software applications as well as marshal outputs on behalf of the same software applications. In some embodiments, multiple mobile computing devices 102 can communicate with a single entity detection device 110. In some embodiments, an addition camera can be included with the entity detection device 110 or the mobile computing device 102 and used for the purpose of recording a particular event that is being monitored. In some embodiments, the entity detection device 110 and the mobile computing device 102 can be synchronised to communicate at set times and frequencies using the synchronised clocks and/or timers.

In some embodiments, entities such as safety equipment on public transport or other public places including fire equipment, hammers to break glass, life jackets can be attached and monitored by entity detection devices 110 reporting movement to a fixed hub to alert of their use and potential unauthorised use or damage. In some embodiments, the a list of user Identifiers is kept as a "white list" so that when an alert is to be sent the alert is not sent if the mobile computing device to perform the detection detects any user's mobile computing device is present as specified on this list wherein optionally the user's mobile computing device has also been moved in recent times to ensure that the user is likely to also be present. In some embodiments, the entity detection device 110 has an ID as well as a range of configurations parameters to tell the said entity detection device as well as the mobile computing device how to respond and alert to different levels of movement, locations, times, and events on a customised way for the entity and/or user as stored in a local and remote database 137 which can be accessed by Identification number.

In some embodiments, the sunscreen dispenser 133 is moved or opened then a signal is sent to the mobile computing device 102 so that it knows the sunscreen dispenser was used and does not therefore matter if left behind. In some embodiments, The entity detection device 110 attached to, or co resident to a multiplicity of entities, can communicate an alert to the mobile computing device 102 via low power RF such as Bluetooth energy when movement or opening or a multiplicity of other events occurs as well as the entity being detected to be leaving an area. Additionally the display 114 and audible 115 components on the entity device 110 can create alerts. In some embodiments, allocating rewards may also include allocating negative points for incorrect behaviour or failure to comply.

Alternatively a small indicator on the entity detection device 110 on the cup such as an led could also be configured to be displayed. In some embodiments, the power usage of the entity detection device 110 can be reduced by having the processor, for example, as one non limiting example, the texas instruments cc2540 processor enter a sleep mode with minimal current drawn and have devices such as a MEMs Accelerometer generate an interrupt to awaken the processor rather than have the processor poll the sensors regularly. In some embodiments, the systems described here combining software and hardware may be used at production time to create and ship to customers a fixed product, while in other embodiments the system can be supplied as a configurable or customizable system where the user connects the individual sensors and defines the sensor program 197. In some embodiments, the communication between the entity detection device 110 and other devices 110 and 102, 109 can be done with Bluetooth Low Energy or other low power rf methods, or other rf methods, including WiFi, as well as wire connections or standard wire. Communication between mobile computing devices 102, 109, and servers 1001 and other devices can be done by Bluetooth Low Energy, WiFi, internet connections, sms, chat, facebook or other social media communication mediums. In some embodiments, the use of electronic equipment may be monitored by the use of hall effect, magnetometer, or induction of voltage or current in a sensor coil attached to the power cord or other sections of the device from where energy usage can be detected. These sensors are connected to the entity detection device 110 and measure the can be used with a sensor program 197 and sensor detection pattern 196 to detect and alert, or rewards points or negate points based on the measured usages of devices.

In some embodiments the rewards and games unlock may be mechanisms for granting and storing rewards, displaying them to others and/or playing games as hosted by social network and media sites such as but not limited to Facebook, Google, Google Plus. In some embodiments, the entity detection device 110 may be attached to critical medical devices such as Inhalers, epi pen, heart medications, pill boxes as some non limiting examples and as described for hats, sunscreen and umbrellas a reminder issued if the user leaves them behind at a particular location or forgets to take them from home. In the case where the medication is for a child and they do not carry a mobile computing device 102, the child may also carry an entity detection device 110 which will check when the device 110 connected to the child and the device connected to the medical device are separated. With the rise in food allergies requiring epi-pens (epinephrine auto injector) and asthma, this method could reduce that chance of a person dying because the device was forgotten. Leaving medicines behind also erodes their effectiveness when they are there fore not able to be taken at the correct times. It is very important that antibiotics not be left behind and by placing a device 110 on the package this can be averted.

In one embodiment, a shared piece of equipment such as a key may have an entity detection device 110 (including an accelerometer 118) attached. When the device 110 is moved as measured by the accelerometer 118, then the device attempts to read an ID associated with the mobile computing device 102 of the person moving the shared piece of equipment. The event of the movement/use of the equipment can be logged by the device 110 including time an duration and location if bluetooth beacons are available, and along with the ID of the person also communicated via 102 to a remote server for logging or monitoring. In one instance, if the equipment is moved without a person ID logged (or an unauthorised one) then an additionally attached alarm may sound.

In some embodiments, the application software on the mobile computing device 102 checks the location of the user periodically using GPS, Wi-Fi or radio towers as some non limiting examples, to determine whether the user is outdoors, and so potentially exposed to UV radiation, by consulting a database of geographical features identifying areas and locations that are not inside or shaded. The application software records how much time, on which days, at what times, and how regularly the user is in these locations. This information can be used to identifies days and times when the system should monitor for the separation of the user and sunscreen dispenser 133 as the user will be at risk of having no sunscreen on days when it is needed.

In some embodiments, the functions described for the entity detection device 110 may be performed by software and sensors in devices such as mobile computing devices 102, as well as devices such as smart watches, including the iOS based devices such as the iWatch and Android and Windows based devices such as smart watches.

Figure 7:
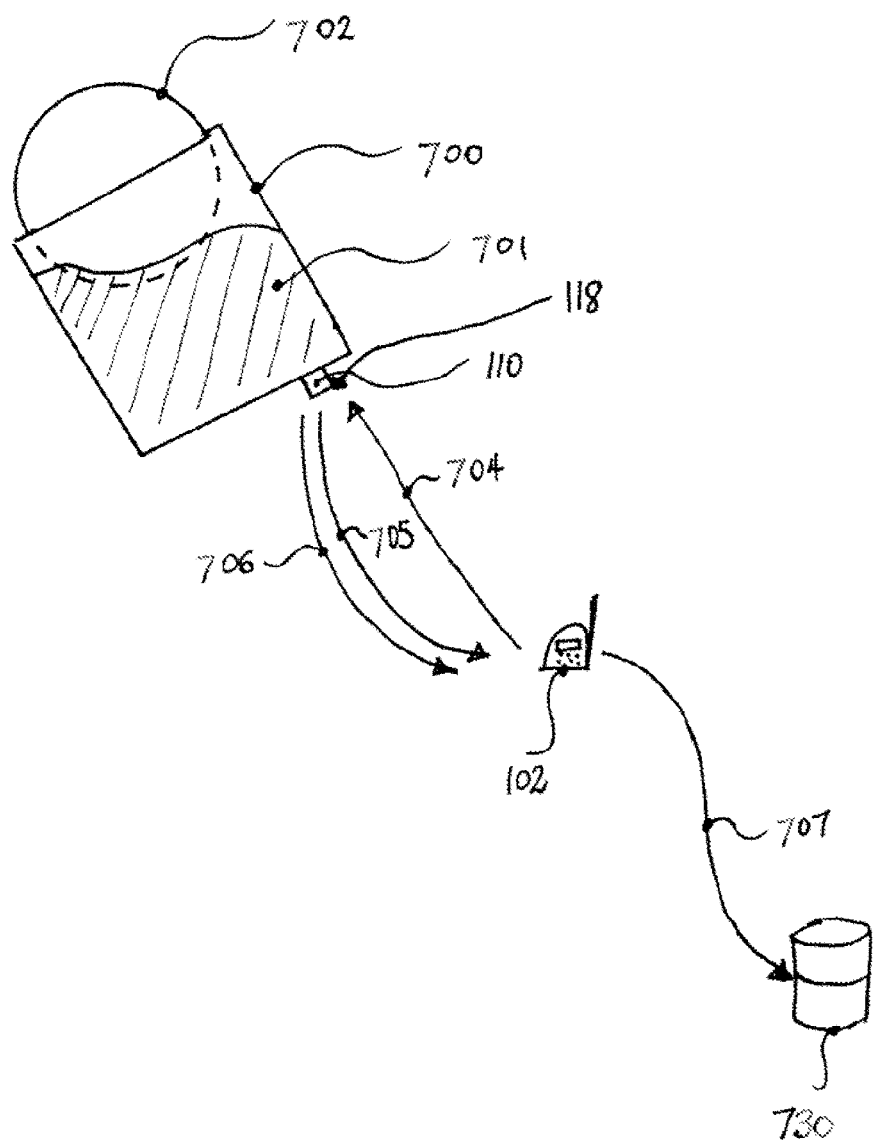
FIG. 7 shows a sunscreen "roll on" dispenser consisting of a roller dispenser sunscreen with a entity detection device attached whose movement is measured by an accelerometer. The accelerometer can be used to check not only that the user has applied sunscreen but also applied over the skin surface sufficiently.

Referring to FIG. 7 shows a sunscreen "roll on" dispenser 700 consisting of a roller 702 dispensing sunscreen 701 with a entity detection device 110 attached whose movement is measured by an accelerometer 118. The accelerometer can be used to check not only that the user has applied sunscreen but also applied over the skin surface sufficiently. Set patterns (sensor detection pattern) and times of acceleration can be used to gauge if sufficient sunscreen has been applied.

The patterns may be derived from recording of acceleration patterns or magnitudes and for what period of time they occur with accounting for variability in the values based on real user studies. The acceleration readings and times can be used to determine whether a sufficiently adequate application event has occurred by processing by the entity detection device 110 which then communicates whether a dispensing event has occurred 705 to the mobile computing device 102 or the raw acceleration and time data 706 maybe transferred to the mobile computing device 102 for processing and determination. The transfer of data 706, 705 may be initiated 704 by the mobile computing device 102 requesting device 110 to transfer any data with the device 110 in listening mode awaiting a request all the time or at regular listening time intervals. Alternatively, the device 110 may transfer results 706,705 at set intervals or pre arranged times with the mobile computing device 102, or when the device 110 and mobile computing device are paired. The results 706, 705 may also be communicated 707 by internet or WiFi as some examples to a server 730 for data access by other parties.

Figure 6:
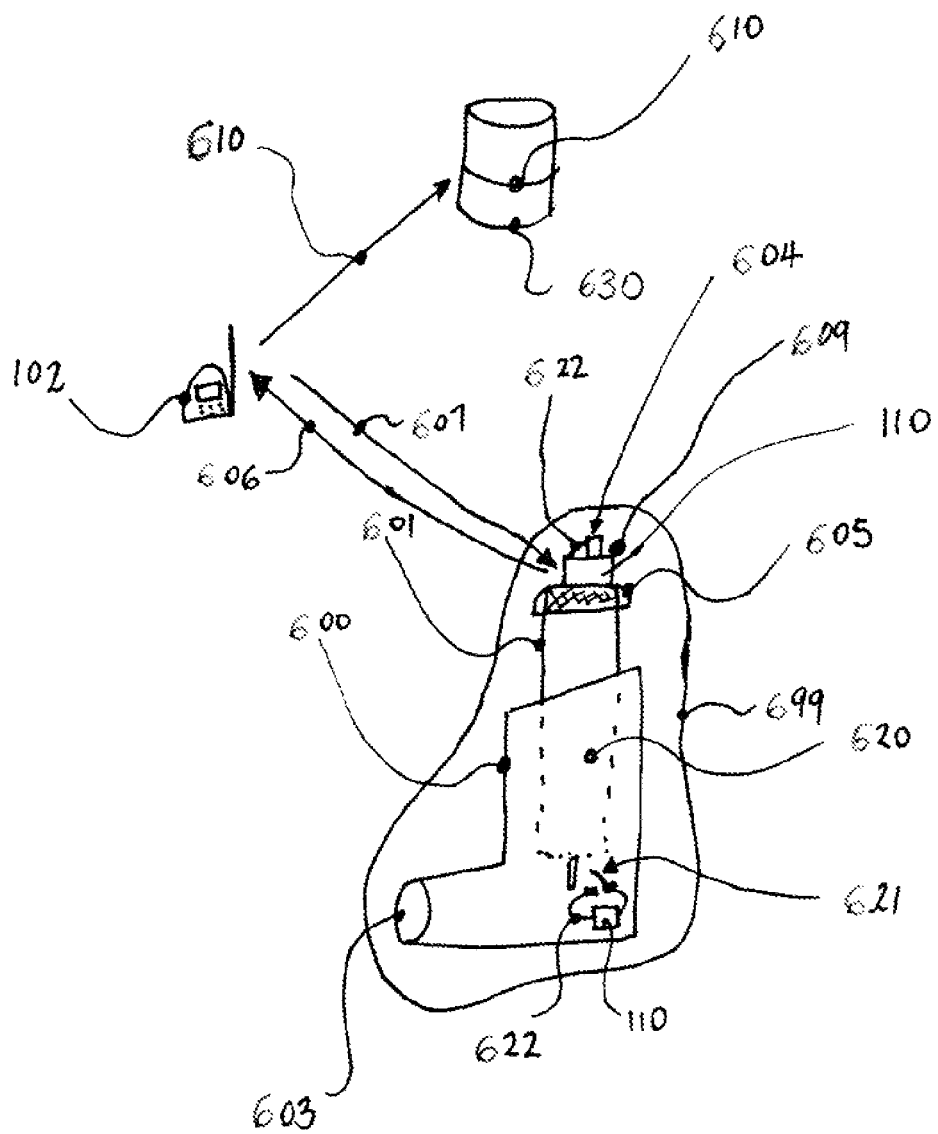
FIG. 6 shows an Inhaler such as a Ventalin™ Inhaler used to treat asthma. When the switch is activated, the Entity Detection Device communicates the usage to the Mobile Computing Device which keeps a count of the number of Inhaler applications of the puffer and so the amount of medication remaining.

Referring to FIG. 6 shows a Inhaler 699 such as a Ventalin™ Inhaler used to treat asthma. The Inhaler consists of an outside section from which the gas is dispensed 603 from a canister 601 that fits inside 620 the outside section 600. To dispense the gas the top of the canister 601 is pressed which is fitted with Entity Detection Device 110 and a switch 604 such as but not limited to, a contact, pressure or capacitive switch connected to the device 110. A connector 605 such as plastic or rubber allows the device 110 and switch 604 to be connected, disconnected and reconnected to new canisters 601 as they are used and replaced. The switch 604 is connected by wire 622 to device 110. When the switch 604 is activated, the Entity Detection Device 110 communicates the usage 606 to the Mobile Computing Device 102 which keeps a count of the number of Inhaler applications of the puffer and so the amount of medication remaining. The mobile computing device 102 can obtain medication information such medication remaining by scanning using it's camera the bar code, QR code of the product package or by other means to know the total number of dispense events possible. The Entity Detection Device 110 may also receive the medication information from the mobile computing device 102 scanned from codes or otherwise as described and using an audio and or visual display such as change or flashing led colors or an small audio alarm 609 to communicate to the user that the medication is running out. An alternative method of measuring the dispensing would involve the use of a contact switch 621 at the base of the canister 601 to detect dispensing as the canister is depressed. The switch is connected by wire 622 to device 110. As described the dispensing event 606 may be communicated to the mobile computing device 102 when it occurs if the device 102 is listening either all the time or at set prearranged intervals. Alternatively, device 110 may be in listening mode at regular intervals when it has new dispensing information and when the mobile computing device 102 requests an update 607 it responds with the dispenses count 606 as some non limiting examples. The dispensing count 606 combined with other information such as when and where it occurred may be communicated and stored 610 in the server 630.

A significant number of hospital admissions occur because the dispenser is appears to still have gas but has actually run out and the patient's condition deteriorates because they were not medicated. This system would permit the user (parent and or child) to have visibility through alert on the mobile computing device which is often a high visibility way to receive information and or alerts. The server 630 can also calculate when the dispenser is running low and provide sms, push alerts or other warns to multiple devices 102 as well as automate reorders from suppliers. Software on the mobile computing device 102, 110 or 630 could also be used to predict and warn the average or shortest time before the medication will run out as well as allow patterns of usage such as time location and frequency from 610 to be used to determine patterns where asthma is triggered. This concept could also be applied to other medical treatments.

In some embodiments, the hub 109 may act as a Bluetooth Low Energy beacon.

What is claimed is:

1. A conditional separation alert system, comprising:
   one or more article protection devices, each consisting of a low power transceiver where in each article protection device is attached to a separate weather related article; and
   a mobile computing device having a low power transceiver, a processor, and a memory wherein the mobile device is adapted to wirelessly receive weather data and to determine if any of the weather related articles are relevant to the user of the mobile device based on the weather data, wherein the mobile computing device establishes a communication link with the one or more article protection devices, by a wireless communication link, if the article protection device is attached to a weather related article that has been determined to be relevant to the user, wherein the mobile communications device determines if the distance between the mobile communication device and the one or more article protection devices attached to the relevant article exceeds a threshold and alerting the user that the threshold has been exceeded wherein the distance is determined by the signal strength from the communications link and a warning is displayed on the mobile computing device.

2. The condition separation alert system of claim 1, wherein the weather related article is selected from the class comprising: an umbrella, an article of clothing, sunscreen, and medicine.

3. The condition separation alert system of claim 2, wherein the weather data includes at least data from one member of the class consisting of: temperature, precipitation, UV radiation, pollution, and humidity.

4. The condition separation alert system of claim 2, wherein the communication link includes: Bluetooth, WiFi, cellular or radio.

5. A method of monitoring the location of weather related items, comprising:
   attaching a low power transceiver to one or more weather related article;
   using a mobile computing device with a low power transceiver, processor, and memory to receive weather data wirelessly;
   using the processor to determine which of the weather related items are relevant to the user of the mobile computing device based on the received weather data;
   establishing a communications link between the low power transceiver of the mobile device and the low power transceiver of one or more of the weather related articles that was determined to be relevant to the user;
   monitoring the communications link to determine the distance between the transceiver on at least one of the relevant articles and the mobile computing device; and
   outputting an alert on the display of the mobile computing device if the distance is determined to exceed a threshold.

* * * * *